United States Patent
Nakano et al.

(10) Patent No.: US 6,876,116 B2
(45) Date of Patent: Apr. 5, 2005

(54) PERMANENT MAGNET MOTOR

(75) Inventors: Masatsugu Nakano, Tokyo (JP);
Tsutomu Tominaga, Tokyo (JP);
Hideki Megata, Tokyo (JP); Masafumi Okazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/923,790

(22) Filed: Aug. 24, 2004

(65) Prior Publication Data

US 2005/0023919 A1 Feb. 3, 2005

Related U.S. Application Data

(63) Continuation of application No. 10/232,856, filed on Sep. 3, 2002, which is a continuation-in-part of application No. 09/826,105, filed on Apr. 5, 2001, now Pat. No. 6,462,452.

(30) Foreign Application Priority Data

May 25, 2000  (JP) ........................ 2000-153909

(51) Int. Cl.$^7$ .............................................. H02K 21/00
(52) U.S. Cl. .................................. 310/156.47; 310/254
(58) Field of Search .............................. 310/156, 254, 310/261

(56) References Cited

U.S. PATENT DOCUMENTS

| | | |
|---|---|---|
| 4,025,810 A | 5/1977 | Field |
| 4,029,977 A | 6/1977 | Chai et al. |
| 4,081,703 A | 3/1978 | Madsen et al. |
| 4,672,253 A | 6/1987 | Tajima et al. |
| 4,719,378 A | 1/1988 | Katsuma et al. |
| 4,833,355 A | 5/1989 | Kawashima |
| 4,868,438 A | 9/1989 | Okamoto et al. |
| 4,871,934 A | 10/1989 | Okamoto et al. |
| 4,873,462 A | 10/1989 | Harned |
| 4,874,975 A | 10/1989 | Hertrich |
| 4,933,584 A | 6/1990 | Harms et al. |
| 5,610,464 A | 3/1997 | Asano et al. |
| 5,708,310 A | 1/1998 | Sakamoto et al. |
| 5,818,187 A | 10/1998 | Savage et al. |
| 6,049,153 A | 4/2000 | Nishiyama et al. |
| 6,104,117 A | 8/2000 | Nakamura et al. |
| 6,313,558 B1 | 11/2001 | Abukawa et al. |

FOREIGN PATENT DOCUMENTS

| | | |
|---|---|---|
| JP | 55-71162 | 5/1980 |
| JP | 56-153961 | 11/1981 |
| JP | 62-244259 | 10/1987 |
| JP | 62-268339 | 11/1987 |
| JP | 62-268347 | 11/1987 |
| JP | 5-168181 | 7/1993 |
| JP | 8-126279 | 5/1996 |
| JP | 5-168182 | 12/1996 |
| JP | 10-42531 | 2/1998 |
| JP | 11-18326 | 1/1999 |
| JP | 11-69679 | 3/1999 |
| KR | 1999-0055053 | 7/1999 |

OTHER PUBLICATIONS

J.R. Hendershot, Jr., et al., "Design of Brushless Permanent-Magnet Motors", Magna Physics Publishing and Clarendon Press, Oxford 1994.

*Primary Examiner*—Burton Mullins
(74) *Attorney, Agent, or Firm*—Leydig, Voit & Mayer, Ltd.

(57) ABSTRACT

A permanent magnet motor having a rotor with permanent magnets disposed on the outer circumferential face at a predetermined interval in a peripheral direction, and a stator with magnetic pole pieces arranged at a predetermined spacing in the peripheral direction, the magnetic pole pieces being opposed to the permanent magnets, the stator surrounding the rotor, wherein auxiliary grooves are provided on a face of each magnetic pole piece of the stator opposed to the permanent magnets of the rotor, and a skew having an electric angle in a range of 61° to 84° is provided relatively between the rotor and the stator.

12 Claims, 25 Drawing Sheets

→ ELECTRIC ANGLE OF 72 DEGREES

ELECTRIC ANGLE [DEGREES]

ELECTRIC ANGLE [DEGREES]

← ELECTRIC ANGLE OF 72 DEGREES

ELECTRIC ANGLE OF 72 DEGREES

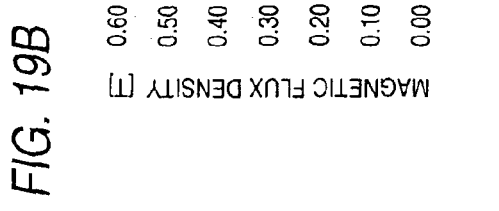
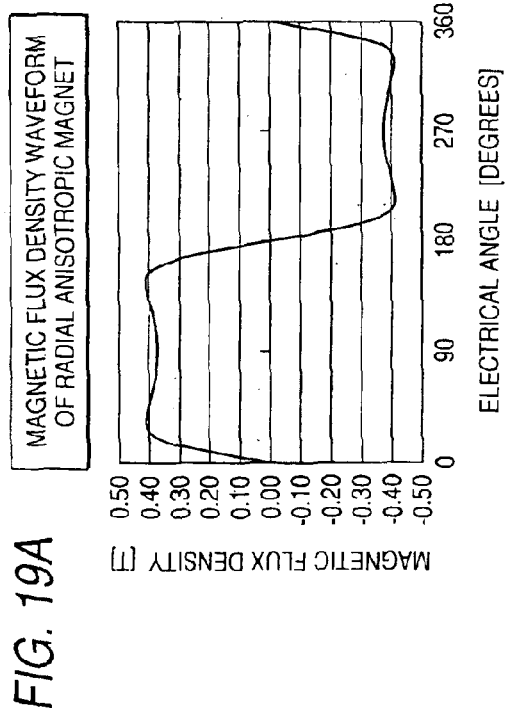
FIG. 19A
FIG. 19B
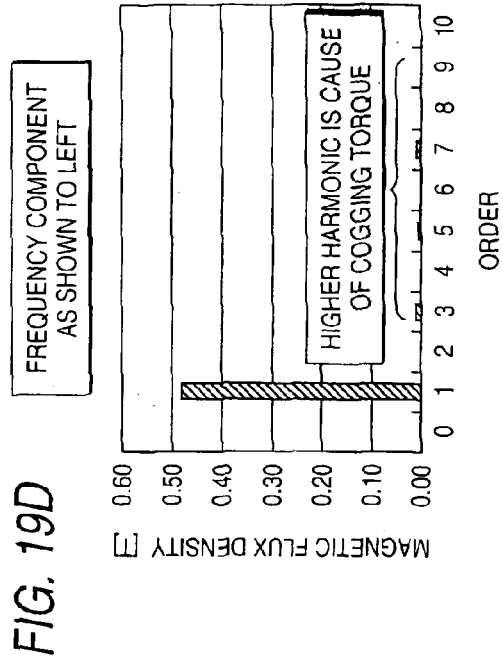
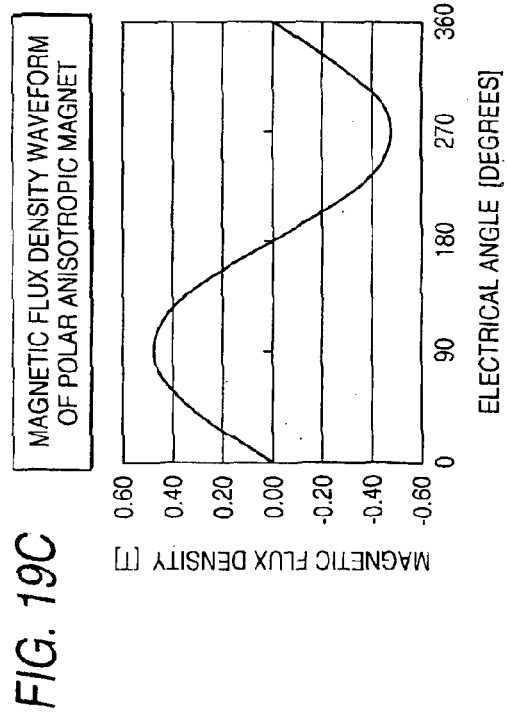
FIG. 19C
FIG. 19D

FIG. 27

| NUMBER OF AUXILIARY GROOVES n | NUMBER OF SLOTS P | (n+1)·P | NUMBER OF POLES M | 180M | LEAST COMMON MULTIPLE X OF M AND (n+1)·P | PERIOD Y [DEGREE (ELECTRICAL ANGLE)] | m | mY [DEGREE (ELECTRICAL ANGLE)] |
|---|---|---|---|---|---|---|---|---|
| 1 | 12 | 24 | 10 | 1800 | 120 | 15.0 | 5 | 75.0 |
| 2 | 12 | 36 | 10 | 1800 | 180 | 10.0 | 7 | 70.0 |
| 3 | 12 | 48 | 10 | 1800 | 240 | 7.5 | 10 | 75.0 |
| 5 | 12 | 72 | 10 | 1800 | 360 | 5.0 | 15 | 75.0 |
| 6 | 12 | 84 | 10 | 1800 | 420 | 4.3 | 17 | 72.9 |
| 7 | 12 | 96 | 10 | 1800 | 480 | 3.8 | 20 | 75.0 |
| 8 | 12 | 108 | 10 | 1800 | 540 | 3.3 | 22 | 73.3 |
| 9 | 12 | 120 | 10 | 1800 | 120 | 15.0 | 5 | 75.0 |
| 2 | 9 | 27 | 8 | 1440 | 216 | 6.7 | 11 | 73.3 |
| 4 | 9 | 45 | 8 | 1440 | 360 | 4.0 | 18 | 72.0 |
| 5 | 9 | 54 | 8 | 1440 | 216 | 6.7 | 11 | 73.3 |
| 6 | 9 | 63 | 8 | 1440 | 504 | 2.9 | 25 | 71.4 |
| 8 | 9 | 81 | 8 | 1440 | 648 | 2.2 | 32 | 71.1 |
| 9 | 9 | 90 | 8 | 1440 | 360 | 4.0 | 18 | 72.0 |
| 1 | 12 | 24 | 14 | 2520 | 168 | 15.0 | 5 | 75.0 |
| 2 | 12 | 36 | 14 | 2520 | 252 | 10.0 | 7 | 70.0 |
| 3 | 12 | 48 | 14 | 2520 | 336 | 7.5 | 10 | 75.0 |
| 4 | 12 | 60 | 14 | 2520 | 420 | 6.0 | 12 | 72.0 |
| 5 | 12 | 72 | 14 | 2520 | 504 | 5.0 | 15 | 75.0 |
| 7 | 12 | 96 | 14 | 2520 | 672 | 3.8 | 20 | 75.0 |
| 8 | 12 | 108 | 14 | 2520 | 756 | 3.3 | 22 | 73.3 |
| 9 | 12 | 120 | 14 | 2520 | 840 | 3.0 | 24 | 72.0 |
| 2 | 9 | 27 | 10 | 1800 | 270 | 6.7 | 11 | 73.3 |
| 3 | 9 | 36 | 10 | 1800 | 180 | 10.0 | 7 | 70.0 |
| 5 | 9 | 54 | 10 | 1800 | 270 | 6.7 | 11 | 73.3 |
| 6 | 9 | 63 | 10 | 1800 | 630 | 2.9 | 25 | 71.4 |
| 7 | 9 | 72 | 10 | 1800 | 360 | 5.0 | 14 | 70.0 |
| 8 | 9 | 81 | 10 | 1800 | 810 | 2.2 | 34 | 75.6 |

PERMANENT MAGNET MOTOR

This patent application is a Continuation of U.S. patent application No. Ser. 10/232,856 filed on Sep. 3, 2002, which is a Continuation-in-Part of U.S. patent application Ser. No. 09/826,105 filed on Apr. 5, 2001, now U.S. Pat. No. 6,462,452 which is incorporated herein by reference in its entirety.

BACKGROUND OF THE INVENTION

1. Field of the Invention

The present invention relates to a permanent magnet motor, and more particularly to a structure of the permanent magnet motor with higher performance in which the cogging torque is reduced and the torque ripple is also reduced.

2. Description of the Related Art

In recent years, there is a demand for electric motors having small cogging torque and torque ripple for various purposes. Conventionally, one method of reducing the cogging torque of a permanent magnet motor has been proposed in which auxiliary grooves are formed on a face of each magnetic pole piece of the stator opposed to the permanent magnets of the rotor, though not shown, as disclosed in JP-A-10-42531, or a skew is provided by the amount of a period of cogging torque, as disclosed in JP-A-8-223832, for example.

In the conventional permanent magnet motor, as described above, the auxiliary grooves are in a face of each magnetic pole piece of the stators opposed to the permanent magnets of the rotor, and a skew is provided in the amount of a period of the cogging torque, to reduce the cogging torque. However, when a skew angle is inappropriate to reduce the torque ripple, the cogging torque and the torque ripple cannot be reduced concurrently. For example, in a six-pole, nine-slot electric motor, with two auxiliary grooves in a face of each magnetic pole piece of the stator, there is almost the equivalent effect as if the number of slots in the stator is 27. Then, the cogging torque ripples per rotation of the rotor is equal to 54, which is the smallest integer having the number of poles, 6, and the virtual number of slots, 27, as factors. The period of cogging torque is converted to 20 degrees in terms of the electrical angle, and the cogging torque can be significantly reduced by an electrical angle skew of 20 degrees.

However, in order to reduce the torque ripple, the fifth and seventh harmonics of the induced voltage must be reduced.

Since the induced voltage usually contains more of the fifth harmonic than of the seventh harmonic, it is effective, for reducing the torque ripple, to provide a skew at an angle where the fifth harmonic can be fully eliminated. However, the fifth harmonic cannot be reduced if the skew is provided at an electrical angle of 20 degrees, as described above. Therefore, in the case where this electric motor is driven by a sinusoidal electric current, the torque ripple does not become small. This is a problem because even if the auxiliary groove or the skew is provided, it has been difficult to reduce the cogging torque and the torque ripple.

SUMMARY OF THE INVENTION

This invention has been achieved to solve the above-mentioned problem, and it is an object of the invention to provide a permanent magnet motor of high performance in which the cogging torque is reduced and the torque ripple is also reduced.

According to a first aspect of the invention, there is provided a permanent magnet motor having a rotor with a plurality of permanent magnets disposed at an interval in a peripheral direction, and a stator with a plurality of magnetic pole pieces arranged at a predetermined spacing in the peripheral direction, the magnetic pole pieces of the stator being opposed to the permanent magnets of the rotor, wherein auxiliary grooves are provided on a face of each magnetic pole piece of the stator that is opposed to the permanent magnets of the rotor, and a skew having an electric angle of 72° is provided relatively between the rotor and the stator.

According to a second aspect of the invention, there is provided the permanent magnet motor, wherein a skew having an electric angle of 72° is provided relatively between the rotor and the stator, where the number of poles is equal to 2N, and the number of slots is equal to 3N (N is an integer greater than or equal to 1).

According to a third aspect of the invention, there is provided the permanent magnet motor, wherein a skew having an electric angle of 72° is provided relatively between the rotor and the stator, where the number of poles is equal to N, and the number of slots is equal to 3N (N is an integer greater than or equal to 2).

According to a fourth aspect of the invention, there is provided the permanent magnet motor according to claim 1, wherein a skew having an electric angle of 72° is provided relatively between the rotor and the stator, where the number of poles is equal to 4N, and the number of slots is equal to 3N (N is an even number greater than or equal to 1).

According to a fifth aspect of the invention, there is provided the permanent magnet motor, wherein either one of the rotor and the stator has a skew.

According to a sixth aspect of the invention, there is provided the permanent magnet motor, wherein both the rotor and the stator has a skew.

According to a seventh aspect of the invention, there is provided the permanent magnet motor, wherein four auxiliary grooves are provided for every magnetic pole piece.

According to an eighth aspect of the invention, there is provided the permanent magnet motor, wherein the windings of the stator are concentrated.

According to a ninth aspect of the invention, there is provided the permanent magnet motor, wherein the permanent magnet of the rotor is magnetized in a radial direction.

BRIEF DESCRIPTION OF THE DRAWINGS

FIGS. 19A–19D are graphs representing the characteristics of a radial anisotroic magnet and a polar anisotropic magnet.

FIG. 27 is a table listing examples of permanent magnet motors with number of poles and number of slots according to the invention.

FIG. 31 is a graph representing how the cogging torque varies with respect to b/a.

DETAILED DESCRIPTION OF THE PRESENT INVENTION

The present invention will be described with reference to the accompanying drawings.

First Embodiment

A permanent magnet motor is provided in which the auxiliary grooves are provided in each magnetic pole piece of a stator to shorten the period of cogging torque, and a skew of an electrical angle of 72° is provided relatively between the stator and a rotor, whereby the low cogging torque and the low torque ripple are effected. This principle will be described below.

Here, a way of reducing the harmonics of the induced voltage with the skew, or how the cogging torque changes depending on the number of poles, the number of slots, and the number of auxiliary grooves will be described below.

Figure 8:
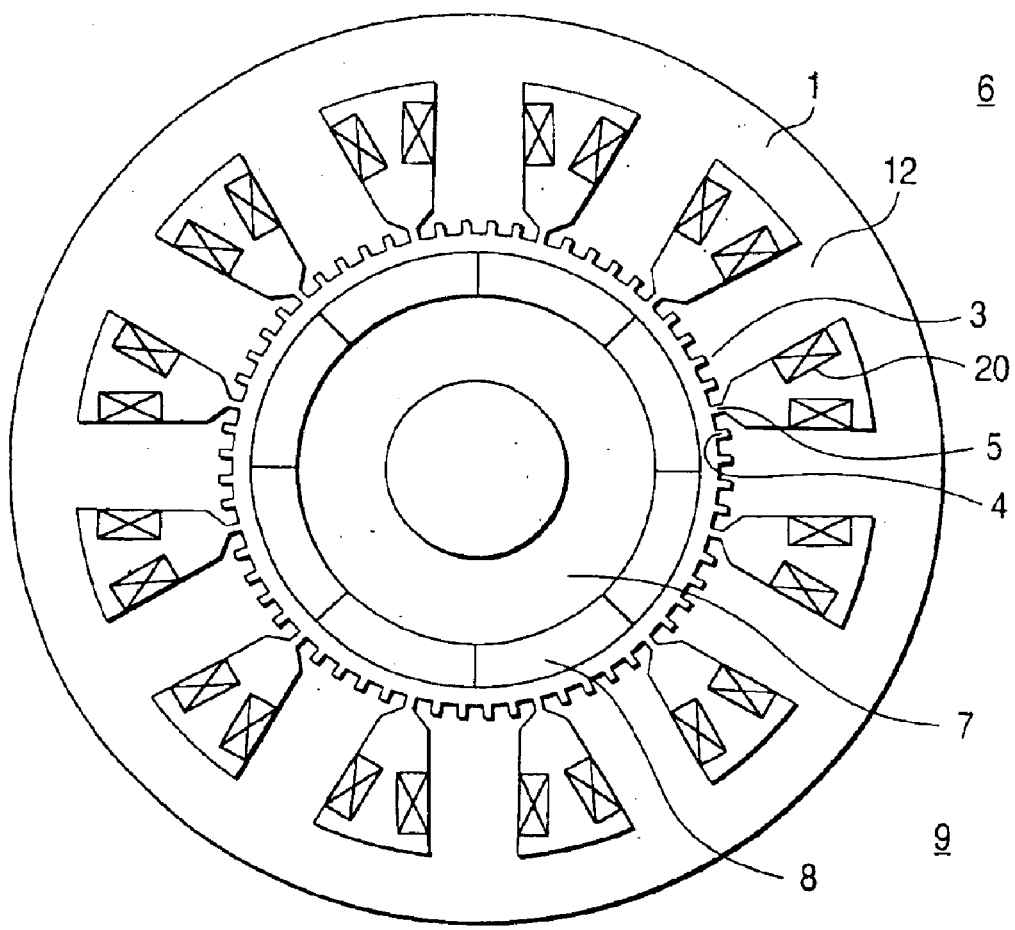
FIG. 8 is a view showing a different configuration from that of the permanent magnet motor of FIG. 6 according to the second embodiment of this invention.

FIG. 8 is a cross-sectional view of a permanent magnet motor.

Figure 15:
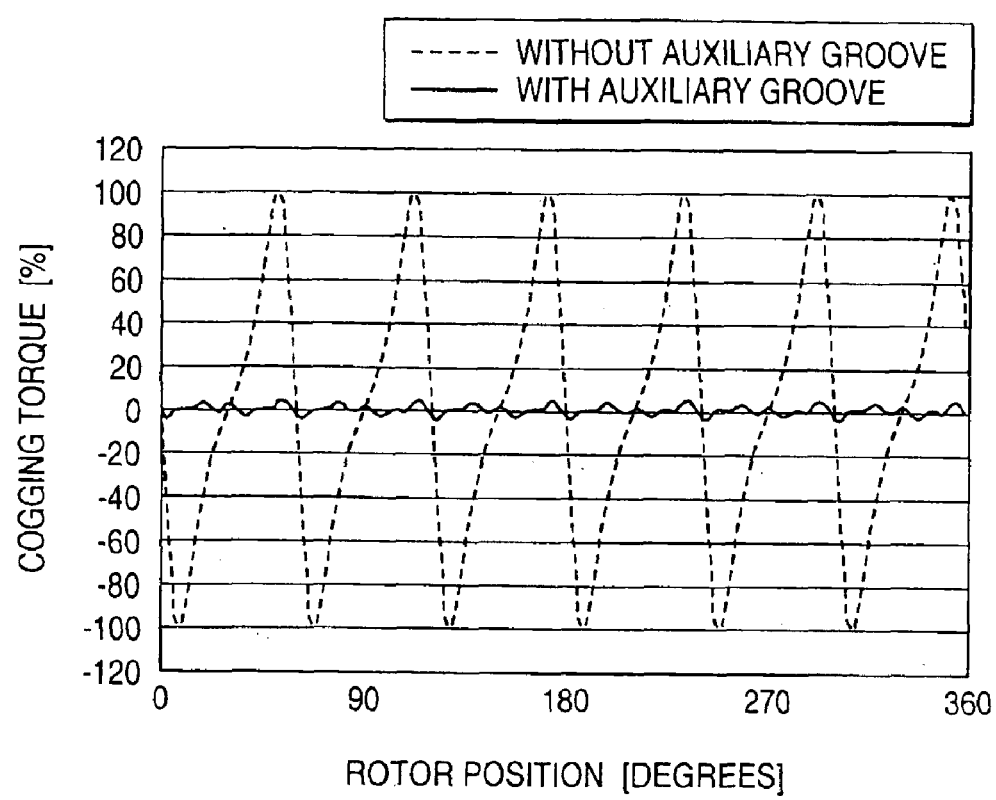
FIG. 15 is a waveform chart showing cogging torque waveforms with and without an auxiliary groove.

Auxiliary grooves 4 are provided at a top end portion of a magnetic pole 12 in a stator 6. FIG. 15 is a waveform chart showing the cogging torque waveform. The abscissa represents the rotation position of a rotor in electric angle, and the ordinate represents the cogging torque. The cogging torque is indicated with the maximum value without auxiliary grooves 4 as 100%. By providing the auxiliary grooves 4 as shown in FIG. 8, the cogging torque becomes significantly smaller.

Figure 16:
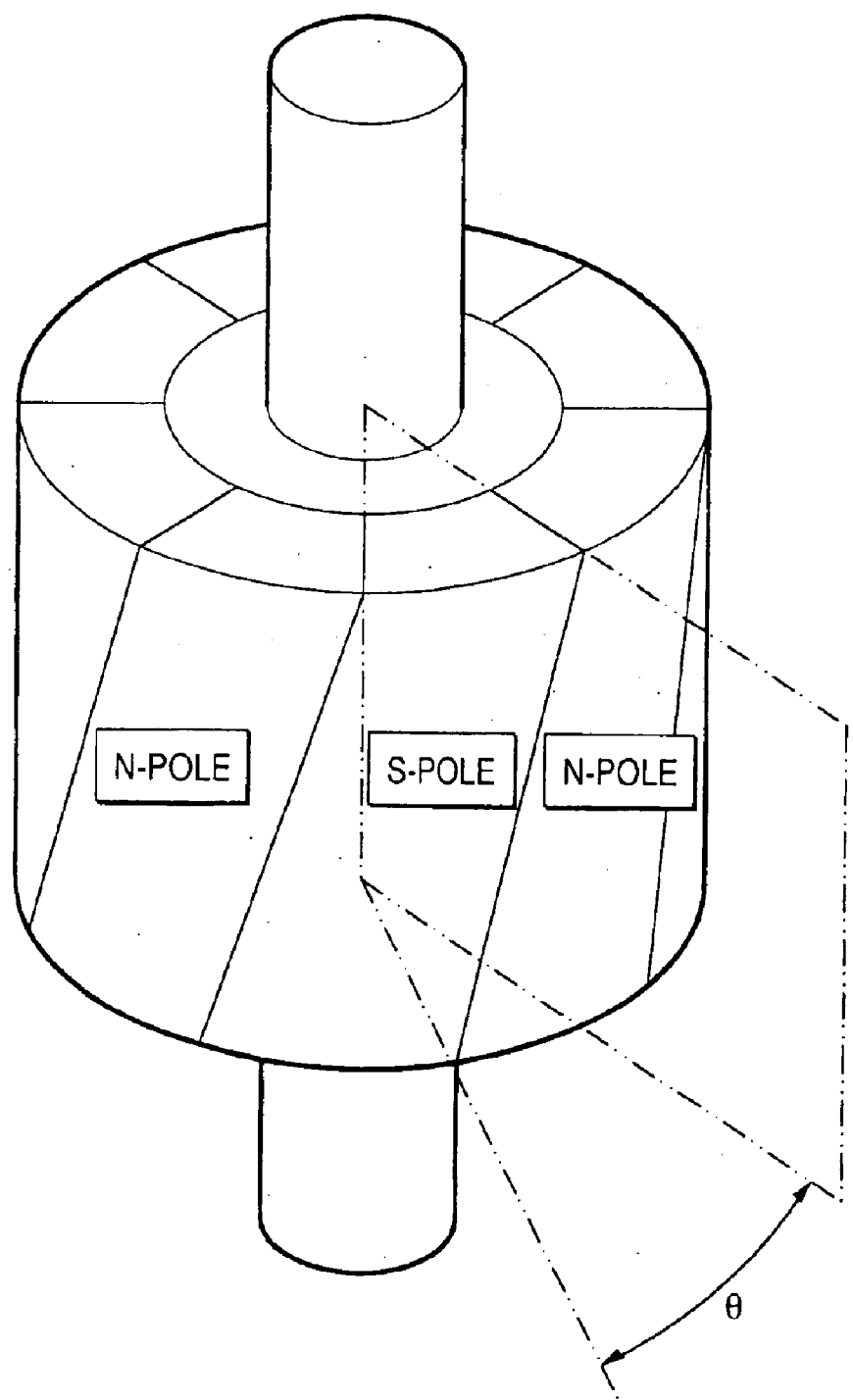
FIG. 16 is a perspective view of the rotor as shown in FIG. 8, as viewed from the side.
Figure 17:
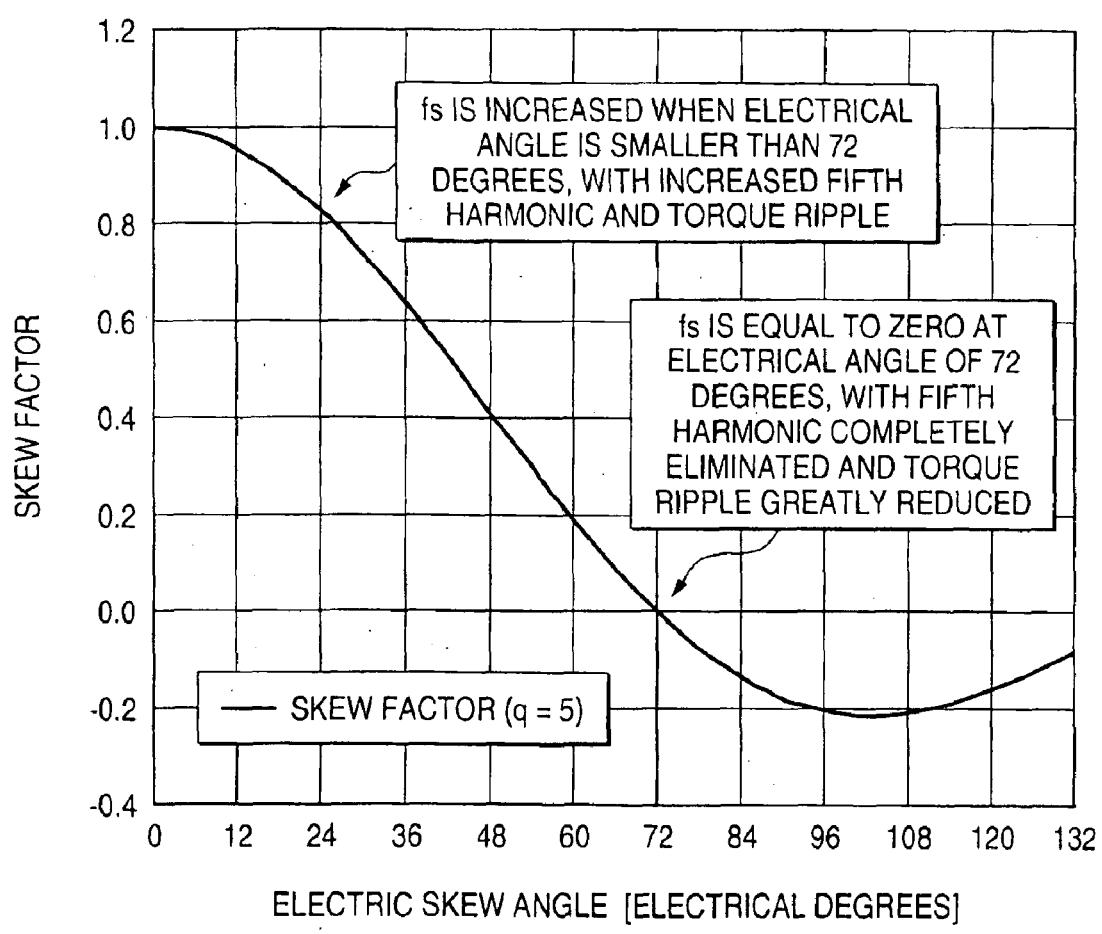
FIG. 17 is a graph showing how the skew factor fs of the fifth harmonic varies with respect to the skew angle.

FIG. 16 is a perspective view of a rotor 9 as shown in FIG. 8. In this example, a skew magnetization is provided in a permanent magnet 8 for the rotor 9. In this manner, the skew provided can reduce the harmonics of magnetomotive force causing the torque ripple. FIG. 17 is a graph representing how the skew factor fs of the fifth harmonic varies with respect to the skew angle. In FIG. 17, the abscissa represents the skew angle, and the ordinate represents the skew factor fs.

When the skew angle is θ° (electrical angle), the skew factor fs for the q-th harmonic of the induced voltage can be represented as in the following expression 1.

$$fs = (2 \sin q\pi\theta/360)/(q2\pi\theta/360) \ldots (1)$$

From this expression (1), when the skew is provided to eliminate harmonics of the induced voltage, the q-th harmonic of the non-load induced voltage can be eliminated completely if θ is selected such that θ is equal to 360/q°. That is, to eliminate the fifth harmonic, it is necessary to make the skew angle θ=360/5=72°. For this reason, it can be expected that the sixth order component (periodic component for an electric angle of 60 degrees) of the torque ripple caused by the fifth harmonic will be greatly reduced when a skew is provided at an electric angle of 72 degrees.

Figure 18:
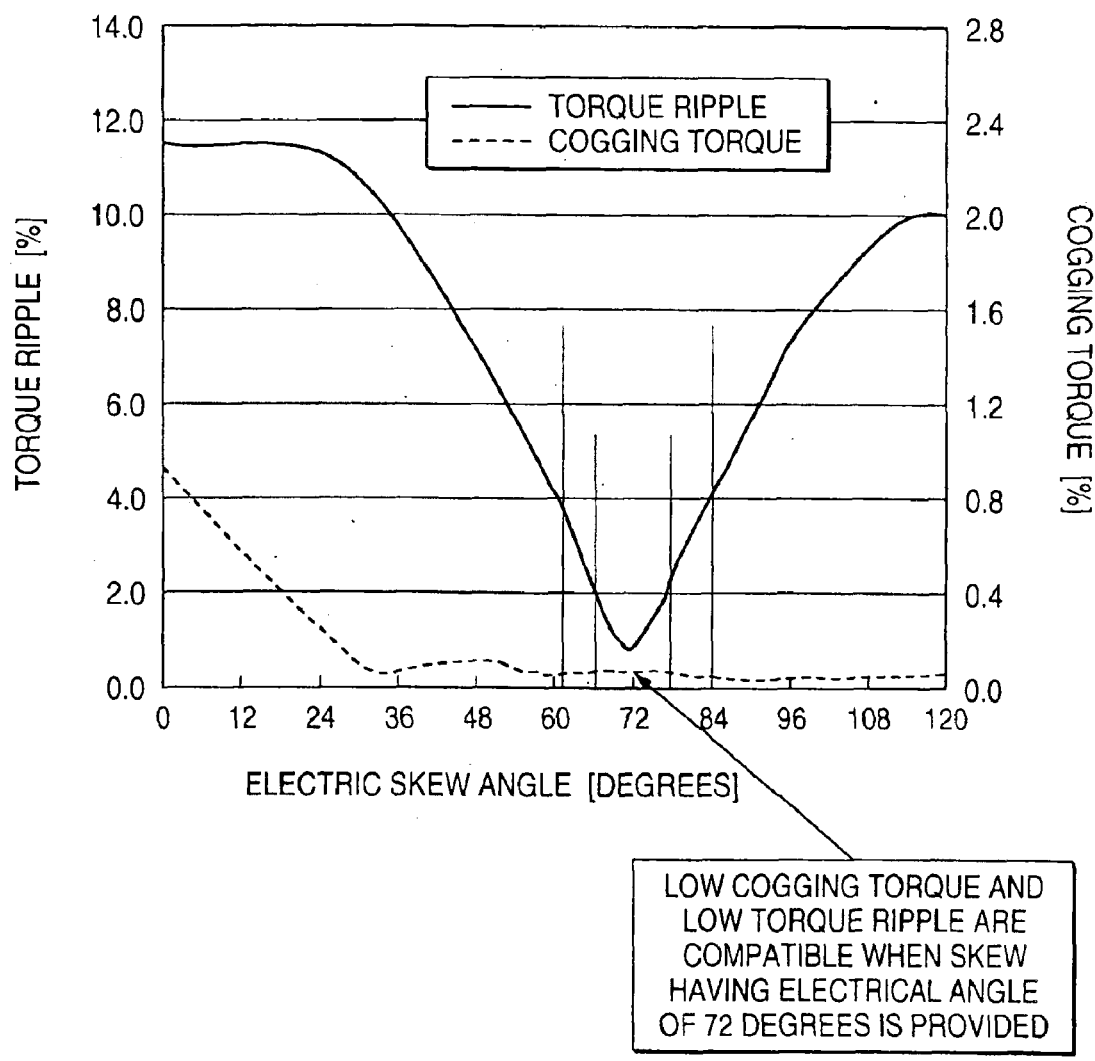
FIG. 18 is a waveform chart showing how the cogging torque and the energizing torque ripple vary with respect to the skew angle.

FIG. 18 is a waveform chart showing how the cogging torque and an energizing torque ripple vary with respect to the skew angle. The abscissa represents the skew angle in electric angle, and the ordinate represents the torque ripple and the cogging torque in percentage (%) of the rated torque. As will be seen from FIG. 17, the torque ripple is greatly reduced when the skew angle is near an electric angle of 72 degrees. This is because the fifth harmonic of the magnetomotive force has been eliminated. Especially when a skew with an electric angle of 65 to 78 degrees is provided, the torque ripple is 2% or less of the rated torque. For example, an electric power steering gear cannot provide an excellent steering feeling to a driver unless the torque ripple of an electric motor for use as a driving source is about 2% or less of the rated torque, in terms of the typical gear ratio. In the case where the torque ripple is 2% or greater of the rated torque, the driver cannot steer smoothly, and feels a pulsation. Also, when a skew with an electric angle of 72 degrees is provided, the torque ripple is as small as 1% or less of the rated torque and the power steering gear can provide an excellent steering feeling.

On one hand, the cogging torque is greatly reduced by the auxiliary grooves 4, and as small as about 0.1% of the rated torque in a range of electric angle from 65 to 78 degrees, as shown in FIG. 15. In the electric power steering system, the cogging torque is very significantly involved in the driver's steering feeling when the steering wheel is turned through a minute angle (minute steering) while driving on a highway. This is due to the fact that since current hardly flows at the time of minute steering, the cogging torque causes a torque pulsation.

Figure 5:
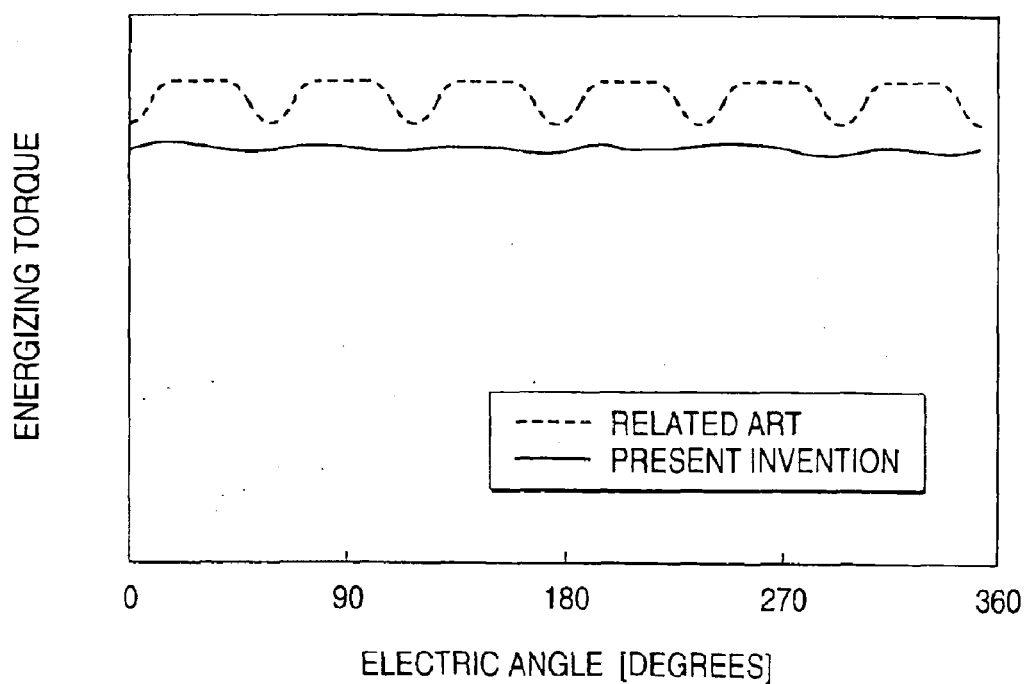
FIG. 5 is a waveform chart showing an energizing torque waveform of the permanent magnet motor in the first embodiment as compared with the conventional one.

FIG. 5 is a chart showing a torque waveform of a permanent magnet motor according to the invention as compared with a conventional motor. In the conventional motor, a sixth order torque ripple (periodic component at an electric angle of 60 degrees) is substantial. On the contrary, in the invention, it can be seen that a sixth order torque ripple is significantly reduced by eliminating the fifth harmonic of magnetomotive force from the stator 6 and the rotor 9. The skew angle for further reducing the cogging torque must be one period of cogging torque or an integer multiple of the period. For example, to reduce the cogging torque having a period of an electrical angle of 60°, a skew angle of an electrical angle of 60° or 120° can be conceived, and because the skew angle for reducing the torque ripple to the minimum is an electrical angle of 72°, as described above, the period of the cogging torque must be a factor of 72°.

Next, how the period of cogging torque changes depending on the number of poles, the number of slots and the number of auxiliary grooves will be described below.

In the case where no auxiliary groove is provided in the magnetic pole piece of the stator, the cogging torque is a ripple torque that is the smallest integer of which the number of poles and the number of slots per rotation of the rotor are factors. The ripple torque becomes smaller with a greater number of ripples. Accordingly, there is a way of increasing th ripple in such so that the auxiliary grooves are provided in the magnetic pole piece of the stator to increase the number of slots, virtually, and shorten the period, as described above.

For example, in the case of an eight-pole and twelve-slot electric motor, the number of auxiliary grooves per magnetic pole piece of stator and the period of cogging torque is as listed in the following table.

TABLE 1

| Number of auxiliary grooves | Number of poles: Number of slots | Number of cogging torque ripples | Period (electrical angle) |
|---|---|---|---|
| 0 | 8:12 | 24 | 60 degrees |
| 1 | 8:24 | 24 | 60 degrees |
| 2 | 8:36 | 72 | 20 degrees |
| 3 | 8:48 | 48 | 30 degrees |
| 4 | 8:60 | 120 | 12 degrees |
| 5 | 8:72 | 72 | 20 degrees |

In Table 1, the number of auxiliary grooves represents the number of auxiliary grooves provided for one magnetic pole piece of stator, the number of slots represents the virtual number of slots including the auxiliary grooves, the number of cogging torque ripples represents the number of cogging torque ripples per rotation of rotor, and the period represents the period (electrical angle) of cogging torque.

From this Table 1, the skew angle for reducing the cogging torque can be found. For example, in the case where two auxiliary grooves are provided, the period of cogging torque is 20 degrees in electrical angle, whereby a skew amounting to an integer multiple of 20 degrees may be employed to reduce the cogging torque.

In order to reduce the torque ripple, it is effective that the skew have an electrical angle of 65 to 78 degrees, as described above, but because no multiple of 20 is equal to a value in a range of 65 to 78 degrees, the cogging torque cannot be further reduced for a skew with an electrical angle of 65 to 78 degrees. On the other hand, when four auxiliary grooves are provided, the period of cogging torque is equal to an electrical angle of 12 degrees. Hence, when a skew with an electrical angle of 72 degrees is employed to reduce the torque ripple, the torque ripple and the cogging torque can be further reduced at the same time, because 12 is a factor of 72 and the skew is an integer multiple (6) of the period of cogging torque.

As described above, with the invention, the auxiliary grooves are provided in the stator magnetic pole of the permanent magnet motor, in which a skew with an electrical angle of 65 to 78 degrees, preferably 72 degrees, is provided in the stator. Therefore, there is the effect of "Compatibility between the low cogging torque and the low torque ripple" that was conventionally not obtained. Also, when the electric motor is employed as a driving source of an electric power steering system, the excellent steering feel is provided for a driver.

In the first embodiment, it is assumed that the permanent magnet motor and gear in the electric power steering gear are directly connected with each other without a coupling made of rubber or the like. In order to achieve an excellent steering feeling, the torque ripple is made to equal or less than 2% of the rated torque. Accordingly, the skew angle has been set in a range of 65 degrees to 78 degrees in electric angle. However, by adding a rubber coupling or rubber cushion, even if the torque ripple is equal to or less than 4% of the rated torque, the driver has an excellent steering feeling. Therefore, the skew angle may be in a range of 61 degrees to 84 degrees in electric angle.

Embodiments of the present invention will be described below with reference to the drawings.

Second Embodiment

Figure 1:
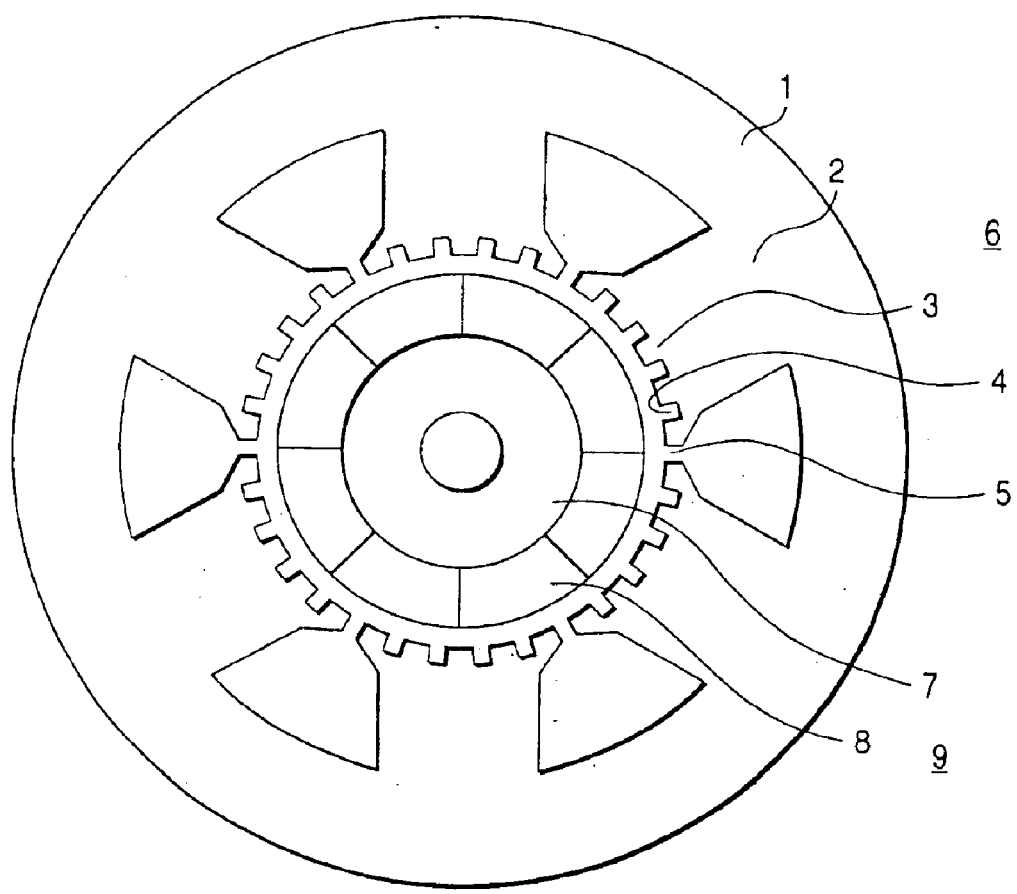
FIG. 1 is a view showing a relation (eight poles, six slots) between a stator and a rotor of a permanent magnet motor according to a first embodiment of the present invention.
Figure 2:
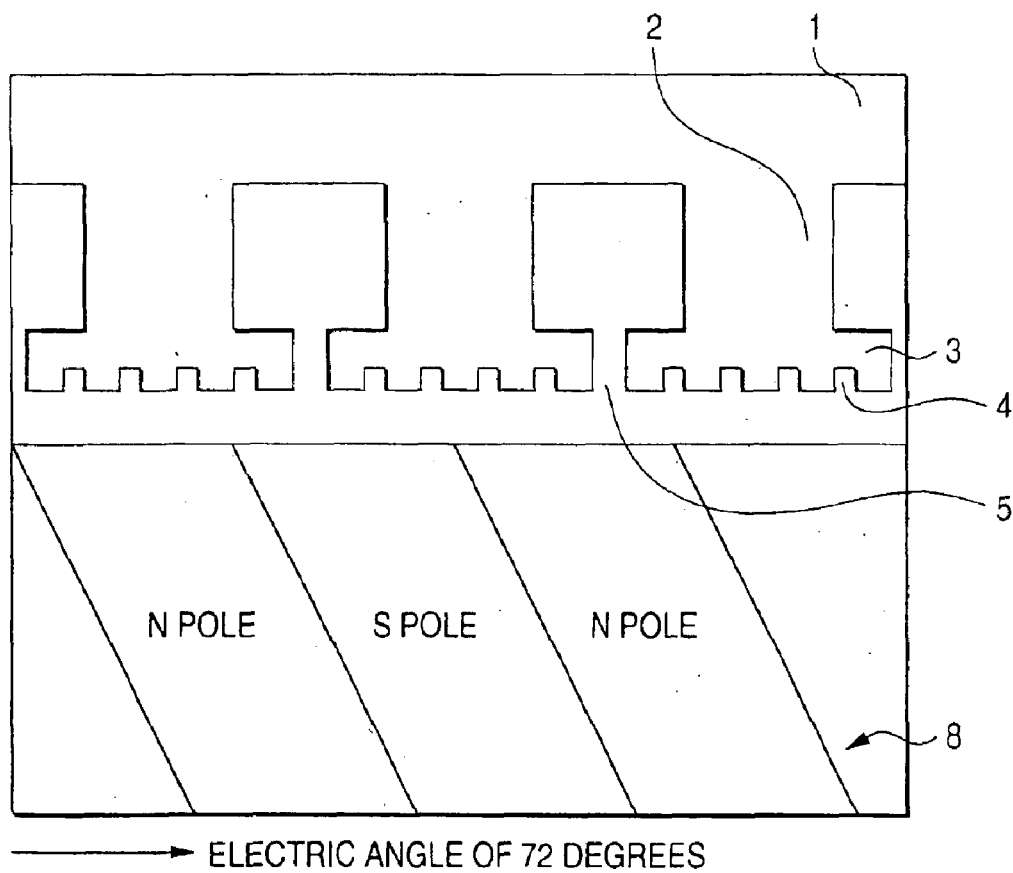
FIG. 2 is a view showing the concept in the case where a skew with an electric angle of 72 degrees is disposed in the rotor of the permanent magnet motor as shown in FIG. 1.
Figure 3:
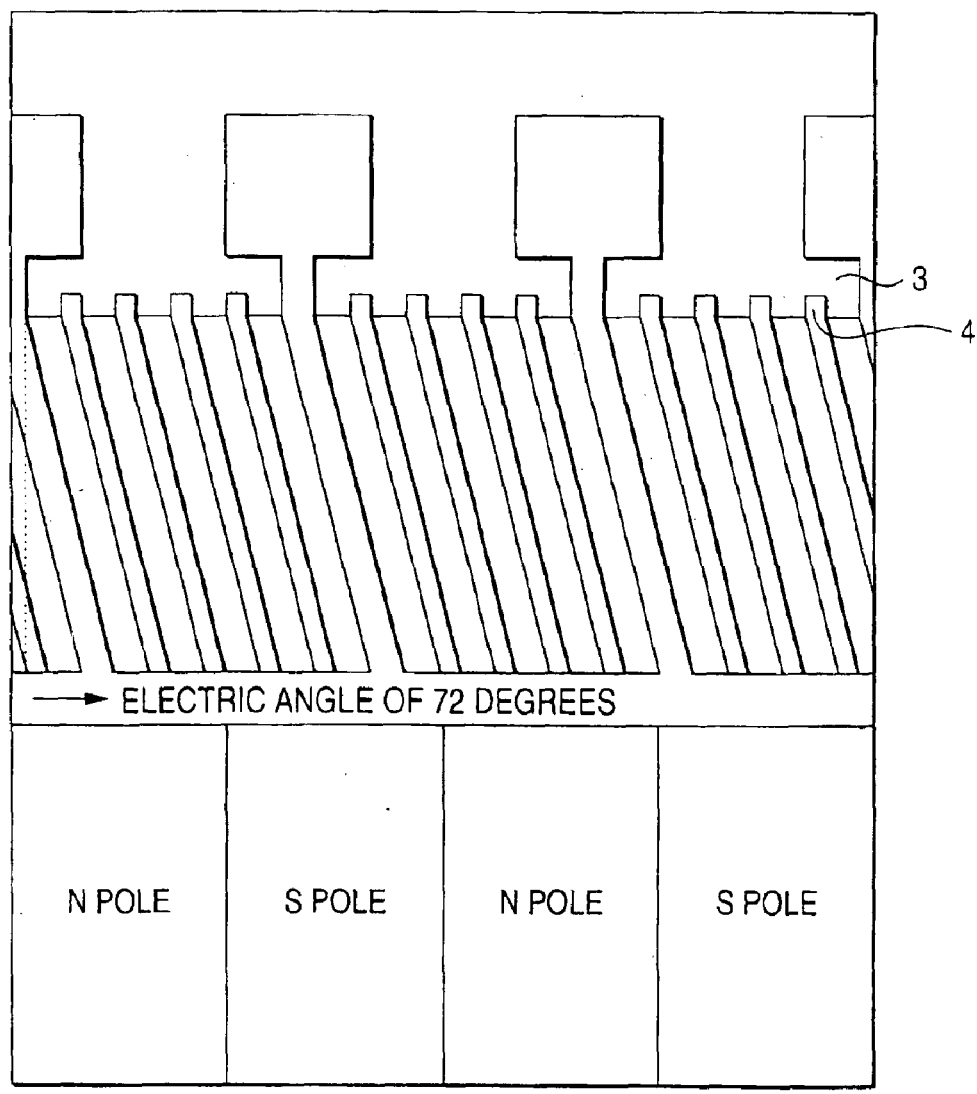
FIG. 3 is a view showing the concept in the case where a skew with an electric angle of 72 degrees is disposed in the stator of the permanent magnet motor as shown in FIG. 1.
Figure 4:
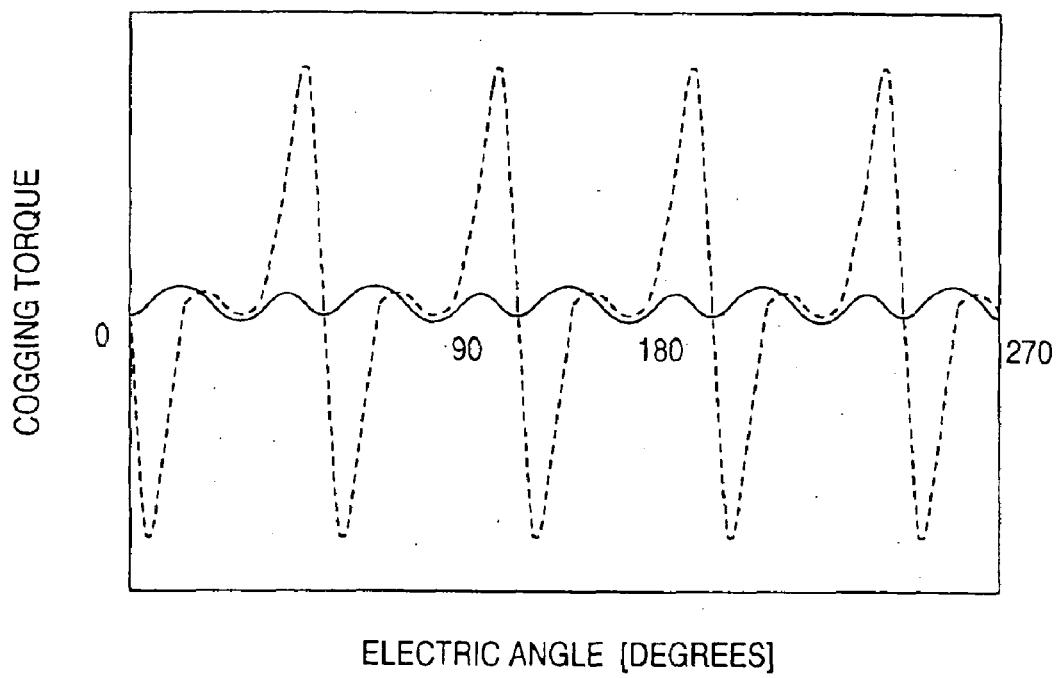
FIG. 4 is a waveform chart showing a cogging torque waveform of the permanent magnet motor in the first embodiment as compared with the conventional one.

FIG. 1 shows a relation between a stator and a rotor in a permanent magnet motor (eight poles, six slots) according to a second embodiment of the invention. FIG. 2 is a view showing the concept in the case where a skew with an electric angle of 72 degrees is disposed in the rotor of the permanent magnet motor as shown in FIG. 1. FIG. 3 is a view showing the concept in the case where a skew with an electric angle of 72 degrees is disposed in the stator of the permanent magnet motor as shown in FIG. 1. FIG. 4 is a waveform chart showing the cogging torque waveform of the permanent magnet motor of the second embodiment, as compared with the conventional one. FIG. 5 is a waveform chart showing the energizing torque waveform of the permanent magnet motor of the second embodiment, as compared with the conventional one.

In FIGS. 1 and 2, reference numeral 1 denotes an annular yoke member. Reference numeral 2 denotes six magnetic pole members protruding at a predetermined spacing on the inner circumferential side of the yoke member 1. Reference numeral 3 denotes magnetic pole pieces at the top end of each magnetic pole member 2. Reference numeral 4 denotes four auxiliary grooves on the inner peripheral face of each magnetic pole piece 3. Reference numeral 5 denotes a slot between magnetic pole pieces 3, in which six slots are provided, and each slot has winding (not shown) arranged inside, as shown in FIG. 1. A stator 6 is comprised of the annular yoke member 1, the magnetic pole members 2, magnetic pole pieces 3, auxiliary grooves 4, and slots 5. Eight permanent magnets 8 are attached around the surface of a rotations axle 7, each permanent magnet extends an axial direction. As shown in FIG. 2, a skew with an electric angle of 72 degrees is employed. A rotor 9 comprises the rotation axle 7 and the permanent magnets 8.

The permanent magnet motor in the second embodiment includes the stator 6 and the rotor 9, which are constituted in the above way. Since four auxiliary grooves 4 are provided for each magnetic pole piece 3, there is substantially the same effect that thirty slots 5 are virtually provided. The cogging torque has one hundred twenty ripples per revolution of the rotor 9, and the period of cogging torque is an electric angle of 12 degrees. Since each permanent magnet 8 of the rotor 9 is skewed with an electric angle of 72 degrees, it follows that the skew is disposed by six times the period of cogging torque. Therefore, the cogging torque can be reduced significantly, and the fifth harmonic of the induced voltage can be completely eliminated, as shown by the solid line in FIG. 4, in contrast to the conventional one as indicated by the broken line. Consequently, the torque ripple can be also reduced as indicated by the solid line in FIG. 5, as compared with the conventional one indicated by the broken line.

In the configuration of FIGS. 1 and 2, the permanent magnets 8 of the rotor 9 are skewed to provide the skew with an electric angle of 72 degrees relatively between the stator 6 and the rotor 9. Alternatively, the auxiliary grooves 4 formed on the inner peripheral face of each magnetic pole piece 3 of the stator 6 may be skewed so as to provide the skew with an electric angle of 72 degrees relatively between the stator 6 and the rotor 9, as shown in FIG. 3, and it is needless to say that the similar effect can be attained.

When a skew is provided in the rotor alone, as shown in FIG. 2, the permanent magnet motor is easily constructed by skew magnetization, whereby there is the effect that the productivity is improved.

It is effective that a skew is provided in the stator alone, when the magnet of the rotor is a segmented magnet as shown in FIG. 3. In the case of the segmented magnet, the skew magnetization is not easily achieved, but the shape of magnet can be readily changed. If the magnet is shaped to reduce harmonic components of the magnetomotive force, the cogging torque and the torque ripple can be lowered.

Figure 12:
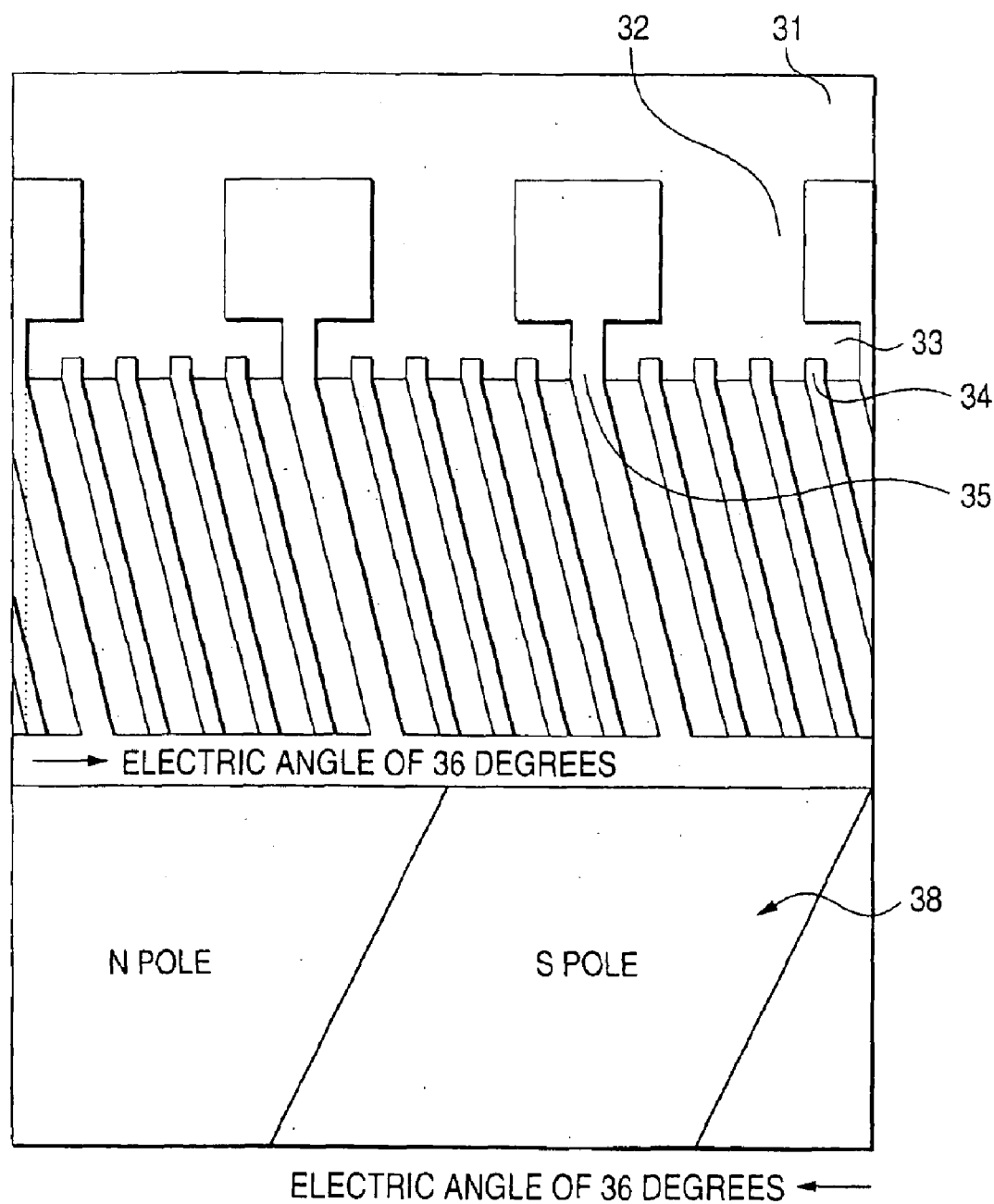
FIG. 12 is a view showing the concept in the case where a skew with an electric angle of 36 degrees is disposed in each of the stator and rotor of the permanent magnet motor as shown in FIG. 11.

FIG. 12 is a view showing an example in which a skew is provided in each of the stator and rotor of the permanent magnet motor.

Since the skew is provided in each of the stator and rotor, there is the effect that the cogging torque and the torque ripple can be reduced.

This embodiment has been described in connection with the case in which a skew is provided in one direction. However, a so-called V-shape skew may be also used in which the direction of the skew is reversed near the axial center. The V-shape skew is particularly preferable in the electric power steering gear, because an electromagnetic force is not produced in the axial direction of the motor.

With the above constitution, the permanent magnets 8 are attached on the surface of the rotation axle 7. Alternatively, the permanent magnets 8 may be embedded into the rotation axis 7.

Further, with the above constitution, the permanent magnet motor has eight poles and six slots. This invention is not limited to such constitution, but in its essence, the number of permanent magnets 8 and the number of slots 5 may be determined to satisfy the requirements that the number of poles is equal to 4N and the number of slots is equal to 3N (N is an integer greater than or equal to 1), and a similar effect can be attained.

Usually, for compatibility between the low cogging torque and low torque ripple, a combination in which the number of poles is equal to 4N and the number of slots is equal to 3N (N is a positive integer) is not very suitable. Generally, as the least common multiple of the number of poles and the number of slots is decreased, the cogging torque decreases. However, in the case where the number of poles is equal to 4N and the number of slots is equal to 3N, it is required to have a larger N to increase the smallest integer of which the number of poles and number of slots are factors, unfavorably resulting in a larger number of poles.

The smallest integer of which the number of poles and number of slots are factors is 24 for eight poles and six slots, whereas it is 72 for eight poles and nine slots. Therefore, it is clear that a combination in which the number of poles is 4N and the number of slots is 3N (N is a positive integer) is unfavorable.

Also, a combination in which the number of poles is 4N and the number of slots is 3N has a large winding factor for the fifth harmonic, and a large torque ripple. However, if the invention is applied, the "compatibility between the low cogging torque and the low torque ripple" is enabled in an electric motor having a combination in which the number of poles is 4N and the number of slots is 3N. Furthermore, an electric motor having the combination in which the number of poles is 4N and the number of slots is 3N can have a large number of parallel circuits, irrespective of a small number of poles (e.g., the number of parallel circuits is one for eight poles and nine slots, while the number of parallel circuits can be increased up to two for an electric motor with eight poles and six slots according to the embodiment (N=2)). In the case where the low voltage and large current are needed in an electric motor for a vehicle including electric power steering, the armature windings can be thin because there are a large number of parallel circuits. Accordingly, the workability for the windings is improved and an electric motor with excellent mass productivity can be produced.

Table 2 lists the number of parallel circuits according to the combination of the number of poles and the number of slots. If the number of parallel circuits is large, the armature current is branched into those parallel circuits, whereby the diameter of winding may be small when the copper loss of the circuits is equal.

Accordingly, as the number of parallel circuits is increases, the diameter of winding becomes thinner, and the winding operation is easier. For example, this embodiment is suitable for an electric motor having a low voltage and large current, such as an electric power steering motor.

TABLE 2

| Number of poles | Number of slots | Possible number of parallel circuits | Maximum number parallel circuits | Diameter of winding |
|---|---|---|---|---|
| 8 | 9 | 1 | 1 | 1.00 |
| 10 | 9 | 1 | 1 | 1.00 |
| 8 | 12 | 1, 2, 4 | 4 | 0.50 |
| 6 | 9 | 1, 3 | 3 | 0.58 |
| 8 | 35 | 1, 2, 4 | 4 | 0.50 |
| 6 | 18 | 1, 3 | 3 | 0.58 |
| 8 | 6 | 1, 2 | 2 | 0.71 |

Third Embodiment

Figure 6:
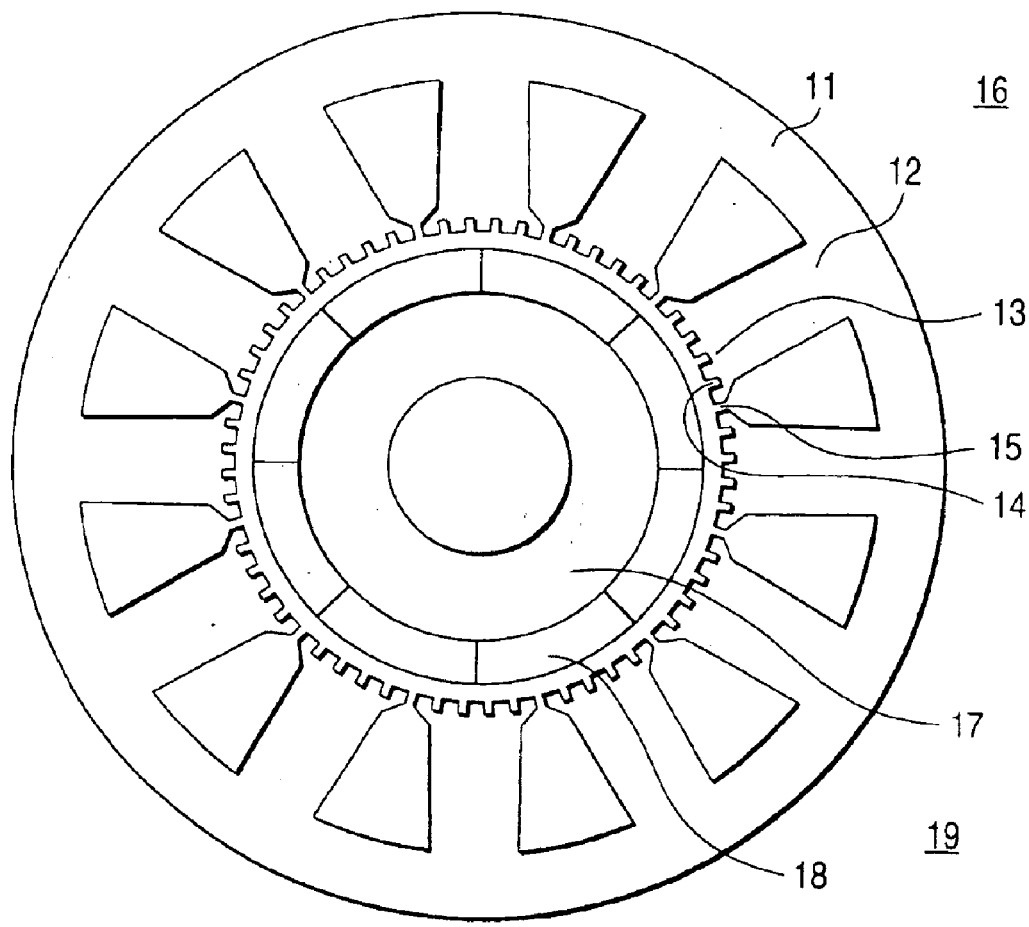
FIG. 6 is a view showing a relation (eight poles, twelve slots) between a stator and a rotor of a permanent magnet motor according to a second embodiment of the invention.
Figure 7:
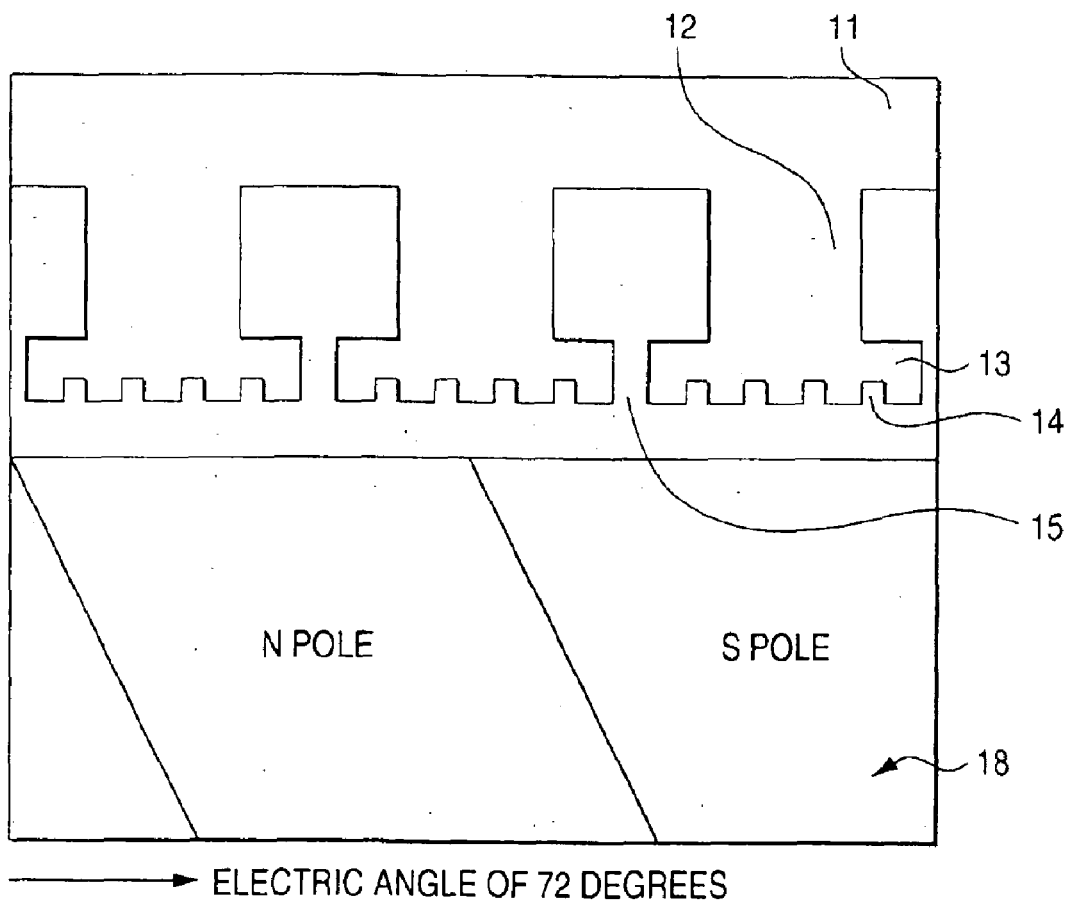
FIG. 7 is a view showing the concept in the case where a skew with an electric angle of 72 degrees is disposed in the rotor of the permanent magnet motor as shown in FIG. 6.

FIG. 6 is a view showing a relation between a stator and a rotor in a permanent magnet motor (eight poles, twelve slots) according to a third embodiment of this invention. FIG. 7 is a view showing the concept in the case where a skew with an electric angle of 72 degrees is disposed in the rotor of the permanent magnet motor as shown in FIG. 6. FIG. 8 is a view showing a different configuration of the permanent magnet motor from that of FIG. 6.

In FIGS. 6 and 7, reference numeral 11 denotes an annular yoke member. Reference numeral 12 denotes twelve magnetic pole teeth member protruding at a uniform interval on the inner circumferential side of the yoke member 11. Reference numeral 13 denotes magnetic pole pieces at the top ends of each magnetic pole member 12. Reference numeral 14 denotes four auxiliary grooves on an inner peripheral face of each magnetic pole piece 13. Reference numeral 15 denotes a slot between magnetic pole pieces 13, in which twelve slots are provided, and each slot has a winding (not shown) arranged inside, as shown in FIG. 6. A stator 16 is comprised of the annular yoke member 11, the magnetic pole members 12, magnetic pole pieces 13, auxiliary grooves 14, and slots 15. Eight permanent magnets 18 are attached around the surface of a rotation axle 17, each permanent magnet extending in an axial direction. As shown in FIG. 7, the skew with an electric angle of 72 degrees is employed. A rotor 19 comprises the rotation axle 17 and the permanent magnets 18.

The permanent magnet motor in the third embodiment includes the stator 16 and the rotor 19, which are constituted in the above way. Since four auxiliary grooves 14 are provided for each magnetic pole piece 13, there is substantially the same effect that sixty slots 15 are virtually provided. The cogging torque has one hundred twenty ripples per revolution of the rotor 19, and the period of cogging torque is an electric angle of 12 degrees. Since each permanent magnet 18 of the rotor 19 is skewed with an electric angle of 72 degrees, it follows that the skew is six times the period of the cogging torque. Therefore, the cogging torque can be reduced significantly, and the fifth harmonic of the induced voltage can be completely eliminated, as in the first embodiment. Consequently, the torque ripple can be reduced.

In the configuration of FIGS. 6 and 7, the permanent magnets 18 of the rotor 19 are skewed to provide the skew with an electric angle of 72 degrees relatively between the stator 16 and the rotor 19. Alternatively, the auxiliary grooves 14 formed on the inner peripheral face of each magnetic pole piece 13 of the stator 16 may be skewed so as to provide the skew with an electric angle of 72 degrees relatively between the stator 16 and the rotor 19, though not shown, and it is needless to say that the similar effect can be attained.

With the above constitution, the permanent magnets 18 are attached on the surface of the rotation axle 17. Alternatively, the permanent magnets 18 may be embedded into the rotation axle 17.

Further, though not described in detail with the above constitution, a magnetic pole teeth member 12 of the stator 16 may be wound with a coil 20 intensively to facilitate the winding operation of the coil 20, making it possible to reduce the size of the stator by shortening the coil end, as shown in FIG. 8.

In the above constitution, the permanent magnet motor comprises eight poles and twelve slots. This invention is not limited to such constitution, but in its essence, the number of permanent magnets 18 and the number of slots 15 may be determined to satisfy the requirements that the number of poles is equal to 2N and the number of slots is equal to 3N(N is an integer greater than or equal to 1), whereby it is needless to say that the similar effect can be attained.

Usually, for the compatibility between the low cogging torque and the low torque ripple, a combination in which the number of poles is equal to 2N and the number of slots is equal to 3N(N is a positive integer) is not very suitable. Generally, as the smallest integer of which the number of poles and the number of slots are factors becomes smaller, the cogging torque becomes smaller. However, in the case where the number of poles is equal to 2N and the number of slots is equal to 3N, it is required to have a larger N to increase the smallest integer, unfavorably resulting in a larger number of poles. For example, an electric motor with the number of poles of 8N and the number of slots of 9N is employed for comparison. The least common multiple is 24 for eight poles and twelve slots (N=4), whereas it is 72 for eight poles and nine slots. Therefore, it is clear that a combination in which the number of poles is 2N and the number of slots is 3N is unfavorable.

Also, a combination in which the number of poles is 2N and the number of slots is 3N has a large winding factor for the fifth harmonic, and a large torque ripple. However, if the invention is applied, the "compatibility between the low cogging torque and the low torque ripple" is enabled in an electric motor having a combination in which the number of poles is 2N and the number of slots is 3N. Furthermore, the electric motor having the combination in which the number of poles is 2N and the number of slots is 3N can have a large number of parallel circuits, irrespective of a small number of poles (e.g., the number of parallel circuits is one for eight poles and nine slots, while the number of parallel circuits can be increased up to four for an electric motor with eight poles and twelve slots (N=4 in this embodiment)). In the case where a low voltage and large current are needed in an electric motor for a vehicle with electric power steering, the armature windings can be thin because there are a large number of parallel circuits. Accordingly, the workability for the windings is improved and an electric motor with excellent mass productivity can be produced.

Fourth Embodiment

Figure 9:
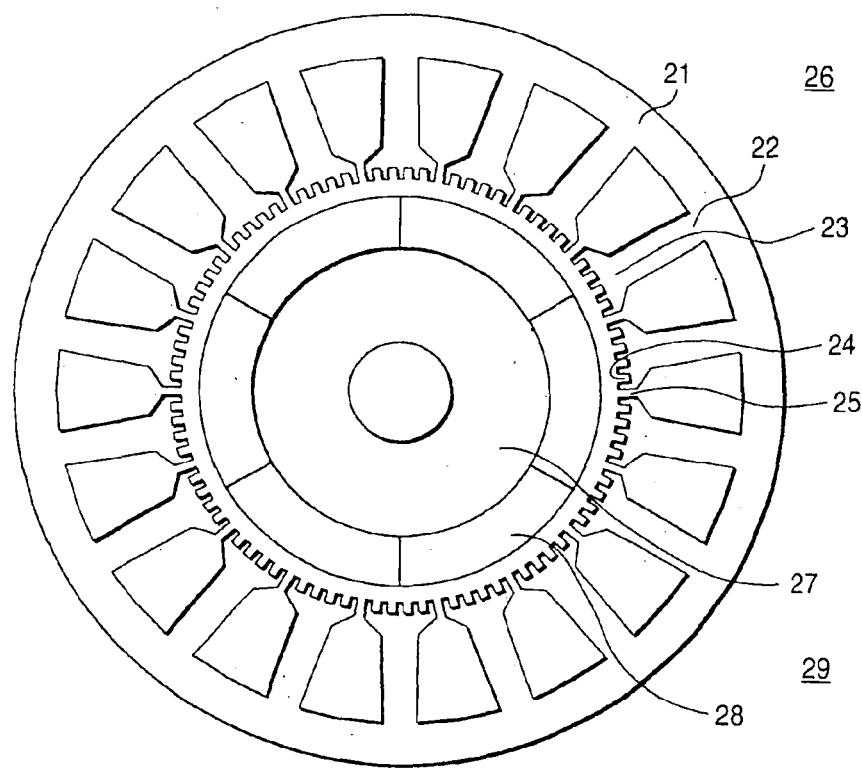
FIG. 9 is a view showing a relation (six poles, eighteen slots) between a stator and a rotor of a permanent magnet motor according to a third embodiment of the invention.
Figure 10:
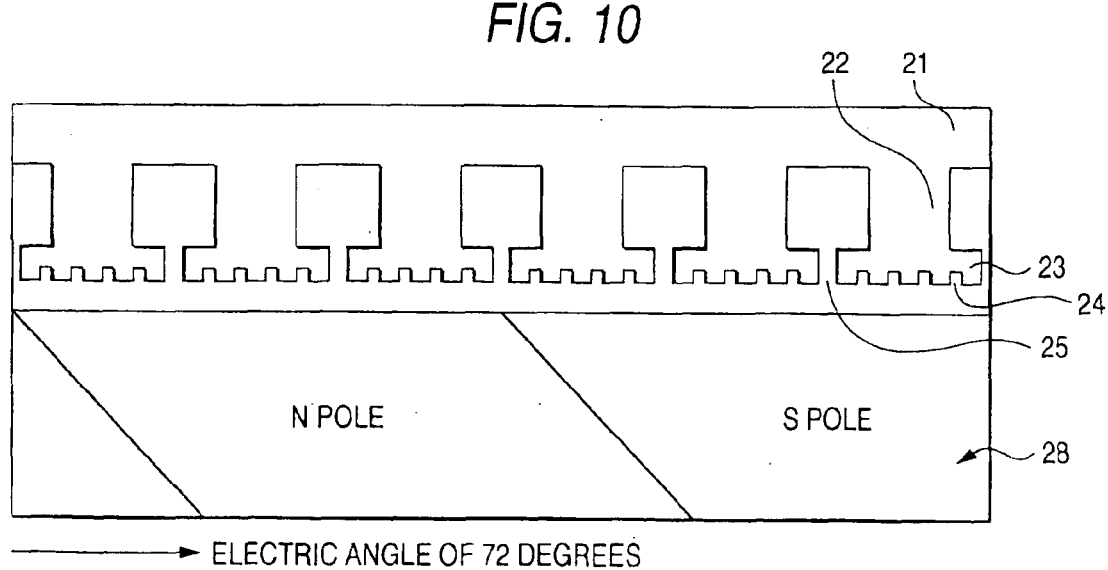
FIG. 10 is a view showing the concept in the case where a skew with an electric angle of 72 degrees is disposed in the rotor of the permanent magnet motor as shown in FIG. 9.

FIG. 9 shows a relation between a stator and a rotor in a permanent magnet motor (six poles, eighteen slots) according to a fourth embodiment of this invention. FIG. 10 is a view showing the concept in the case where a skew with an electric angle of 72 degrees is disposed in the rotor of the permanent et motor as shown in FIG. 9.

In FIGS. 9 and 10, reference numeral 21 denotes an annular yoke member. Reference numeral 22 denotes eighteen magnetic pole members protruding at a predetermined interval on the inner circumferential side of the yoke member 21. Reference numeral 23 denotes magnetic pole pieces at the top end of each magnetic pole member 22. Reference numeral 24 denotes four auxiliary grooves formed on an inner peripheral face of each magnetic pole piece 23. Reference numeral 25 denotes a slot between magnetic pole pieces 23, in which eighteen slots are provided as shown in FIG. 9. A stator 26 is comprised of the annular yoke member 21, the magnetic pole members 22, magnetic pole pieces 23, auxiliary grooves 24, and slots 25. Six permanent magnets 28 are attached around the surface of a rotation axle 27, each permanent magnet extending in an axial direction. As shown in FIG. 10, the skew with an electric angle of 72 degrees is employed. A rotor 29 is comprised of the rotation axle 27 and the permanent magnets 28.

The permanent magnet motor in the third embodiment includes the stator 26 and the rotor 29, which are constituted in the above way. Since four auxiliary grooves 24 are provided for each magnetic pole piece 23, there is substantially the same effect that ninety slots 25 are virtually provided. The cogging torque has ninety ripples per revolution of the rotor 29, and the period of the cogging torque is an electric angle of 12 degrees. Since each permanent magnet 28 of the rotor 29 is skewed with an electric angle of 72 degrees, the skew is six times the period of the cogging torque. Therefore, the cogging torque can be reduced significantly, and the fifth harmonic of the induced voltage can be completely eliminated. Consequently, the torque ripple can be reduced.

In the configuration of FIGS. 9 and 10, the permanent magnets 28 of the rotor 29 are skewed to provide the skew with an electric angle of 72 degrees relatively between the stator 26 and the rotor 29. Alternatively, the auxiliary grooves 24 formed on the inner peripheral face of each magnetic pole piece 23 of the stator 26 may be skewed so as to provide the skew with an electric angle of 72 degrees relatively between the stator 26 and the rotor 29, though not shown, and it is needless to say that the similar effect can be attained.

With the above constitution, the permanent magnets 28 are attached on the surface of the rotation axle 27. Alternatively, the permanent magnets 28 may be embedded in the rotation axle 27.

Further, with the above constitution, the permanent magnet motor comprises six poles and eighteen slots. This invention is not limited to such constitution, but in its essence, the number of permanent magnets 28 and the number of slots 25 may be determined to satisfy the requirements that the number of poles is equal to N and the number of slots is equal to 3N (N is an even number greater than or equal to 2), whereby it is needless to say that the similar effect can be attained.

Usually, for compatibility between low cogging torque and low torque ripple, a combination in which the number of poles is equal to N and the number of slots is equal to 3N(N is an even integer) is not very suitable. Generally, as the smallest integer of which the number of poles and the number of slots are factors becomes smaller, the cogging torque becomes smaller. However, in the case where the number of poles is equal to N and the number of slots is equal to 3N, it is required to have a larger N to increase the smallest integer, unfavorably resulting in a larger number of poles.

The smallest integer of which the number of poles and number of slots are factors is 24 for eight poles and twenty four slots, whereas it is 72 for eight poles and nine slots. Therefore, it is clear that a combination in which the number of poles is N and the number of slots is 3N is unfavorable.

Also, the winding factor is large for the fifth harmonic, and the torque ripple is large. However, if the invention is applied, the "compatibility between the low cogging torque and the low torque ripple" is enabled in an electric motor having the combination in which the number of poles is N and the number of slots is 3N. Furthermore, an electric motor having a combination in which the number of poles is N and the number of slots is 3N can have a large number of parallel circuits, irrespective of a small number of poles (e.g., the number of parallel circuits is one for eight poles and nine slots, while the number of parallel circuits can be increased up to four for an electric motor with eight poles and twenty four slots (N=8 in this embodiment)). In the case where low voltage and high current are needed in an electric motor for a vehicle including electric power steering, the armature windings can be thin because there are a large number of parallel circuits. Accordingly, the workability for the windings is improved and an electric motor with excellent mass productivity can be produced.

Fifth Embodiment

Figure 11:
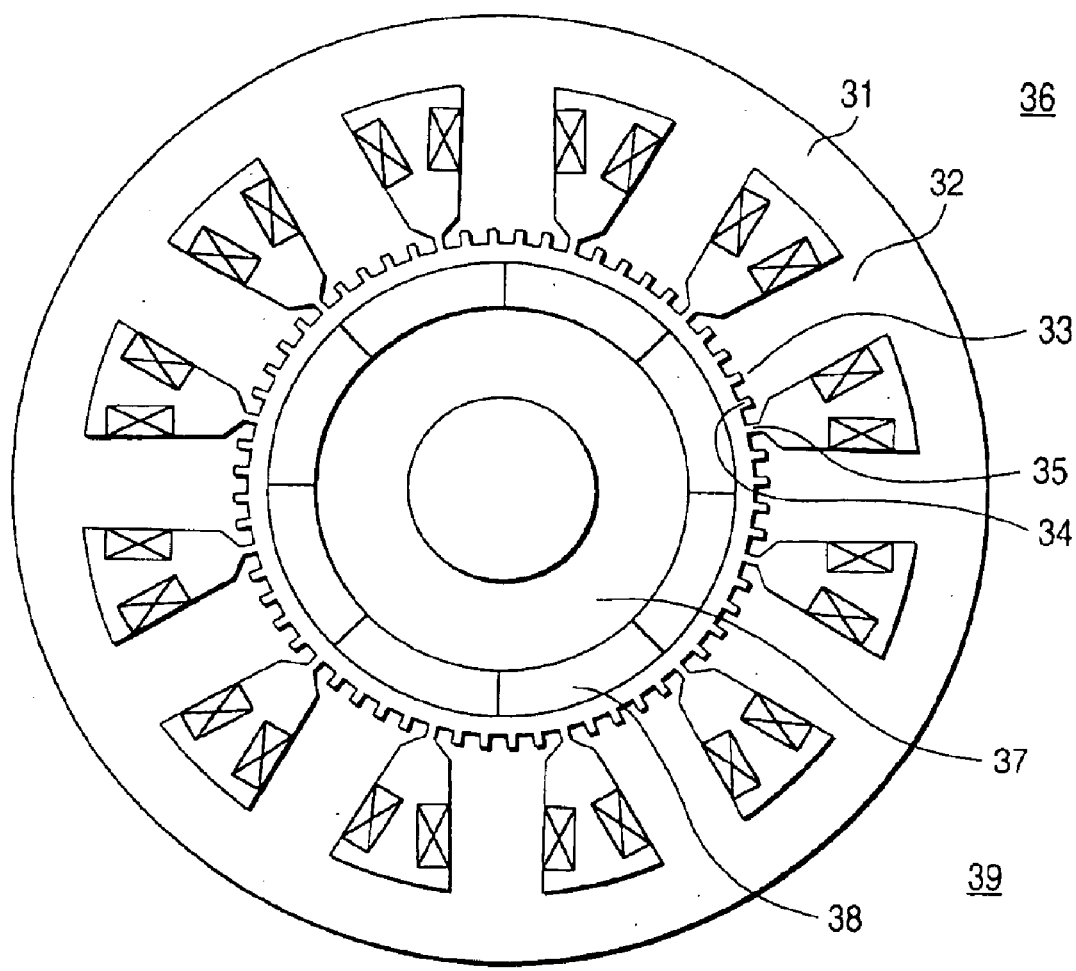
FIG. 11 is a view showing a relation (eight poles, twelve slots) between a stator and a rotor of a permanent magnet motor according to a fourth embodiment of the invention.

FIG. 11 shows a relation between a stator and a rotor in a permanent magnet motor (eight poles, twelve slots) according to a fifth embodiment of this invention. FIG. 12 is a view showing the concept in the case where a skew with an electric angle of 36 degrees is employed in each of the stator and the rotor of the permanent magnet motor shown in FIG. 11.

In FIGS. 11 and 12, reference numeral 31 denotes an annular yoke member. Reference numeral 32 denotes twelve magnetic pole members protruding at a predetermined interval on the inner circumferential side of the yoke member 31. Reference numeral 33 denotes magnetic pole pieces at the top end of each magnetic pole members 32. Reference numeral 34 denotes four auxiliary grooves on an inner peripheral face of each magnetic pole piece 33 and skewed with an electrical angle of 36 degrees in corporation with the magnetic pole members 32 and the magnetic pole pieces 33, as shown in FIG. 12. Reference numeral 35 denotes a slot between magnetic pole pieces 33, and skewed with an electrical angle of 36 degrees, like the auxiliary grooves 34, in which twelve slots are provided as shown in FIG. 11. A stator 36 is comprised of the annular yoke member 31, the magnetic pole members 32, magnetic pole pieces 33, auxiliary grooves 34, and slots 35. Eight permanent magnets 38 are attached around the surface of a rotations axle 37, each permanent magnet extending in an axial direction. As shown in FIG. 12, a skew with an electric angle of 36 degrees is employed. A rotor 39 is comprised of the rotation axle 37 and the permanent magnets 38.

The permanent magnet motor in the fifth embodiment includes the stator 36 and the rotor 39, which are constituted in the above way. Since four auxiliary grooves 34 are provided for each magnetic pole piece 33, there is substantially the same effect that sixty slots 35 are virtually provided. The cogging torque has one hundred twenty ripples per revolution of the rotor 39, and the period of cogging torque is an electric angle of 12 degrees. Since the auxiliary grooves 34 and the slots 35 of the stator 36 and the permanent magnets 38 of the rotor 39 are skewed with an electric angle of 36 degrees, the skew is six times the period of the cogging torque. Therefore, the cogging torque can be reduced significantly, and the fifth harmonic of the induced voltage can be completely eliminated. Consequently, the torque ripple can be reduced.

In the configuration of FIGS. 11 and 12, the skew with an electric angle of 36 degrees is employed in each of the stator 36 and the rotor 39. However, the invention is not limited to such a configuration. Alternatively, the total of skew angles for the stator 36 and the rotor 39 may be in a range of an electrical angle of 65 degrees to an electric angle of 78 degrees, preferably 72 degrees.

With the above constitution, the permanent magnets 38 are attached on the surface of the rotation axis 37. Alternatively, the permanent magnets 38 may be embedded into the rotation axis 37.

Sixth Embodiment

Figure 13:
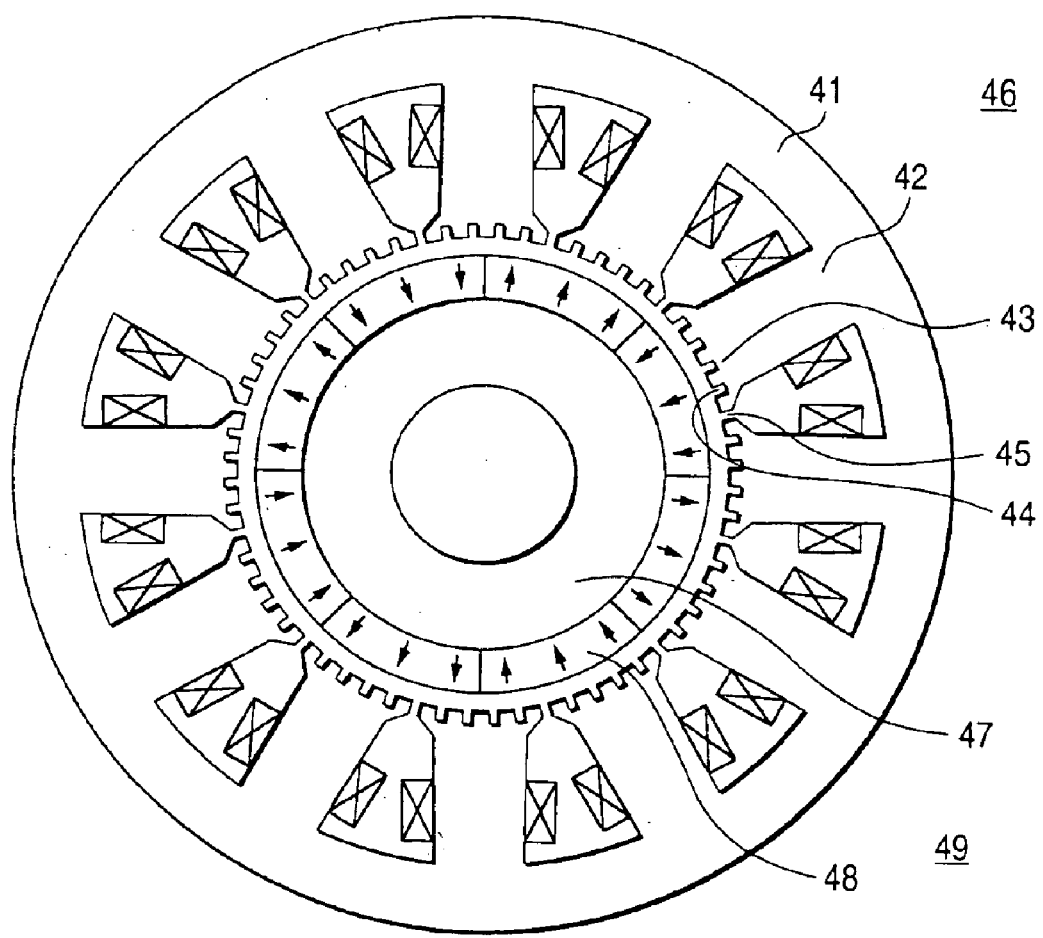
FIG. 13 is a view showing a relation (eight poles, twelve slots) between a stator and a rotor of a permanent magnet motor according to a fifth embodiment of the invention.
Figure 14:
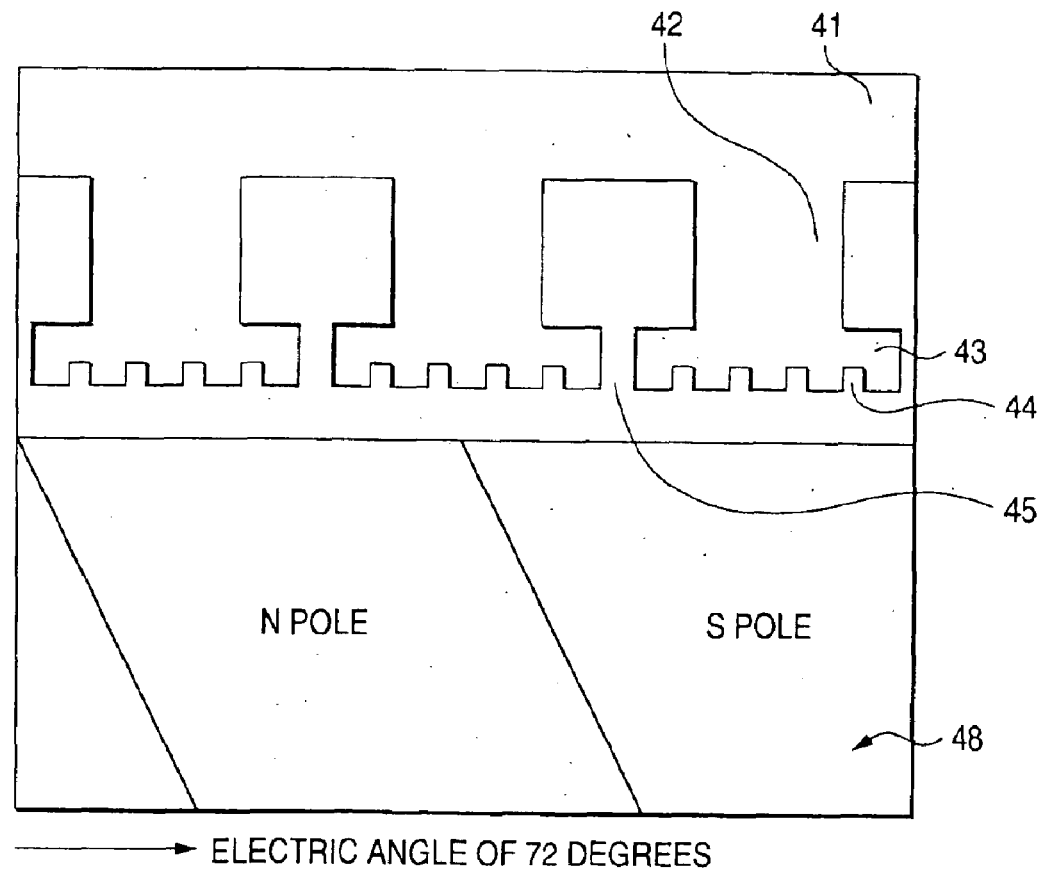
FIG. 14 is a view showing the concept in the case where a skew with an electric angle of 72 degrees is disposed in the rotor of the permanent magnet motor as shown in FIG. 13.

FIG. 13 shows a relation between a stator and a rotor in a permanent magnet motor (eight poles, twelve slots) according to a sixth embodiment of this invention. FIG. 14 is a view showing the concept in the case where a skew with an electric angle of 72 degrees is disposed in the rotor of the permanent magnet motor as shown in FIG. 13.

In FIGS. 13 and 14, reference numeral 41 denotes an annular yoke member. Reference numeral 42 denotes twelve magnetic pole member protruding at a predetermined interval on the inner circumferential side of the yoke member 41. Reference numeral 43 denotes magnetic pole pieces at the top end of each magnetic pole member 42. Reference numeral 44 denotes four auxiliary grooves on an inner peripheral face of each magnetic pole piece 43. Reference numeral 45 denotes a slot between magnetic pole pieces 43, in which twelve slots are provided as shown in FIG. 13. A stator 46 is comprised of the annular yoke member 41, the magnetic pole members 42, magnetic pole pieces 43, auxiliary grooves 44, and slots 45. Eight permanent magnets 38 are attached around the surface of a rotation axle 47, each permanent magnet extending in an axial direction and magnetized in a radial direction. As shown in FIG. 14, a skew with an electric angle of 72 degrees is employed. A rotor 49 is comprised of the rotation axle 47 and the permanent magnets 48.

The permanent magnet motor in the sixth embodiment includes the stator 46 and the rotor 49, which are constituted in the above way. Since four auxiliary grooves 44 are provided for each magnetic pole piece 43, there is substantially the same effect that sixty slots 45 are virtually provided. The cogging torque has one hundred twenty ripples per revolution of the rotor 49, and the period of cogging torque is an electric angle of 12 degrees. Since each permanent magnet 48 of the rotor 49 is skewed with an electric angle of 72 degrees, the skew is six times the period of cogging torque. Therefore, the cogging torque can be reduced significantly, and the fifth harmonic of the induced voltage can be completely eliminated. Consequently, the torque ripple can be reduced.

Figure 20:
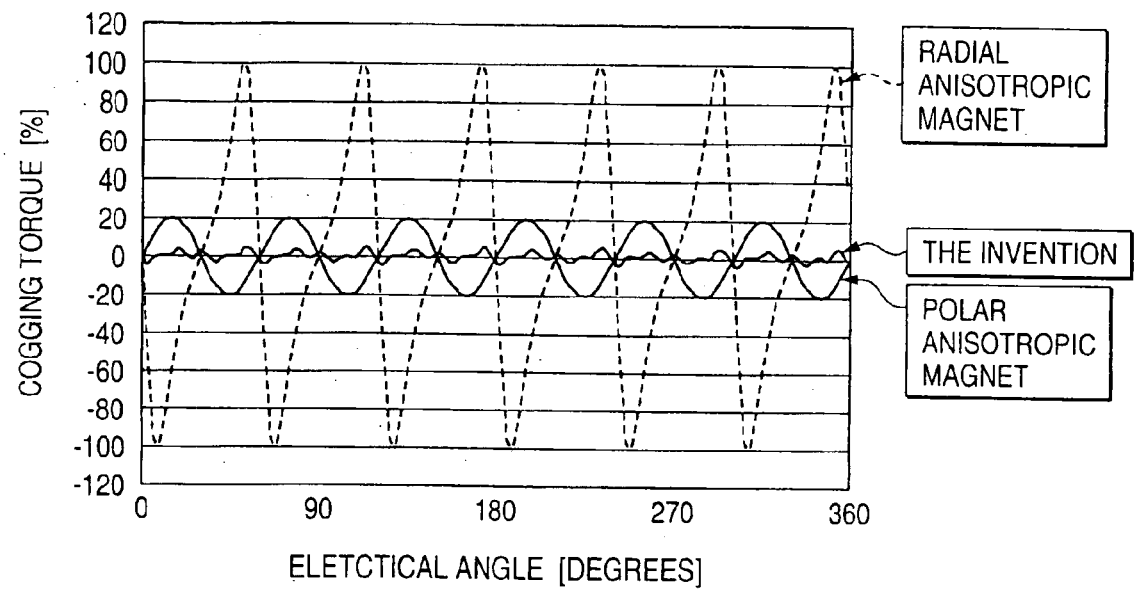
FIG. 20 is a chart showing cogging torque waveforms of a radial anisotropic magnet, a polar anisotropic magnet, and a radial anisotropic magnet according to the invention.

A radial anisotropic magnet has a rectangular waveform of magnetic flux on the surface, and produces a large number of higher harmonic components, as shown in FIGS. 19A and 19B. On the other hand, a polar anisotropic magnet produces a sinusoidal waveform of magnetic flux, and produces few higher harmonic components, as shown in FIGS. 19C and 19D. Accordingly, an electric motor using a radial anisotropic magnet or a radially magnetized magnet has a large cogging torque. FIG. 20 shows the cogging torque waveforms for the radial anisotropic magnet (outside this embodiment), the polar anisotropic magnet (outside this embodiment), and the radial anisotropic magnet of this embodiment. It is noted that the maximum value of the cogging torque of the radial anisotropic magnet is 100% in FIG. 20. As will be seen from this waveform chart, the cogging torque using the radial anisotropic magnet is significantly larger than using the polar anisotropic magnet. However, there is an advantage in that a ring magnet having the radial anisotropy is easily subjected to skew magnetization, and is suitable for this embodiment. The cogging torque can be lower in a case of using the radial anisotropic magnet according to this embodiment than in a case of using the polar anisotropic magnet as shown in FIG. 20. Also, the torque ripple can be lowered, because the fifth harmonic that is a main factor for the cogging torque can be completely eliminated in this embodiment.

Usually, the radial anisotropic magnet or radially magnetized magnet had a problem that the cogging torque was larger because the magnet contained a large amount of higher harmonics of the magnetomotive force. There is an apparent difference as compared with the polar anisotropic magnet indicating a sinusoidal magnetization waveform.

However, according to this embodiment, compatibility between low cogging torque and low torque ripple is obtained. It is difficult to produce skew in a polar anisotropic ring magnet, while the radially anisotropic ring magnet is easily subjected to skew magnetization. Therefore, the skew structure is easily realized without need of providing a skew in the stator core. That is, there is an effect that the mass productivity is improved.

As described above, since the permanent magnet motor using the permanent magnets 48 magnetized in the radial direction has a magnetomotive force containing many harmonics, and has large cogging torque or torque ripple, the significant reduction effect can be expected.

With the above constitution, the permanent magnets 48 are attached on the surface of the rotation axle 47. Alternatively, the permanent magnets 48 may be embedded in the rotation axle 47.

In the above-described embodiments, four auxiliary grooves are provided for each magnetic pole piece, but may be appropriate for easy processing in consideration of the size of magnetic pole pieces.

Seventh Embodiment

In the first embodiment, the fifth harmonic was noted to greatly reduce the torque ripple. If the skew angle is an electric angle of 65 to 78 degrees, the torque ripple can be reduced to 2% or less of the rated torque, as described previously. Preferably, the skew angle is an electric angle of 72 degrees to reduce the fifth harmonic completely. The cogging torque is greatly reduced owing to the effect of the auxiliary grooves and the skew, and the "compatibility between the low cogging torque and the low torque ripple" can be realized, as described previously. To further reduce the cogging torque, the skew angle may be an integer multiple of the cogging torque period.

Figure 21:
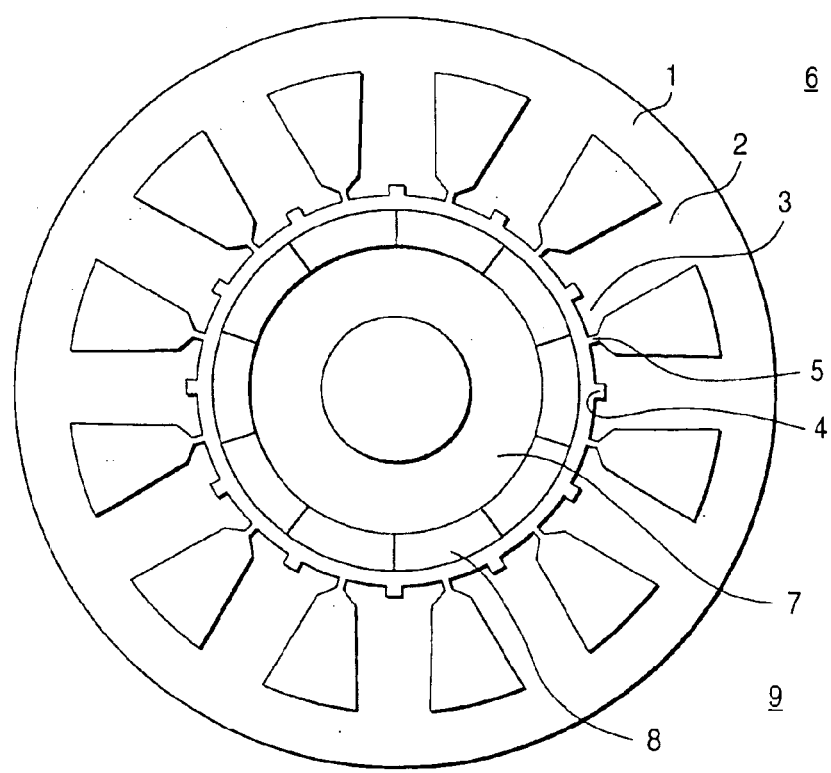
FIG. 21 is a view showing a relation between a stator and a rotor of a permanent magnet motor according to an embodiment of this invention.

A practical electric motor is exemplified below. FIG. 21 is a cross-sectional view of a permanent magnet motor with 10 poles and 12 slots. The same or like parts are designated by the same numerals as in the first embodiment, and the description of those parts is omitted.

Figure 22:
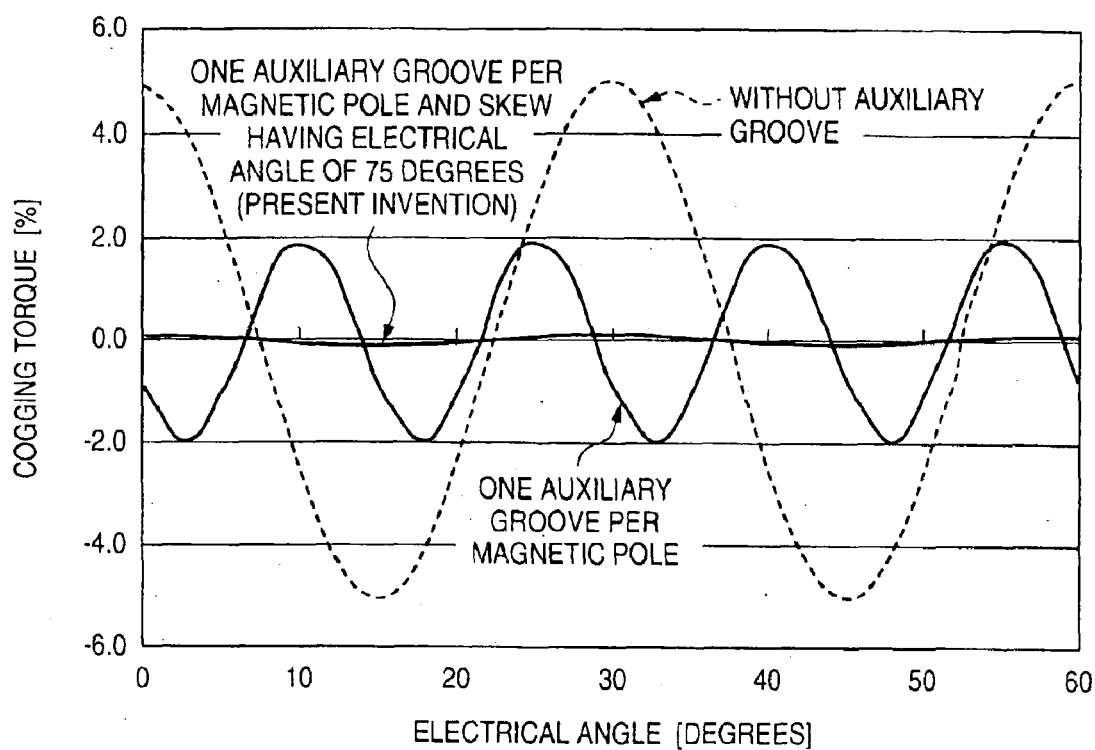
FIG. 22 is a chart showing the cogging torque waveforms with and without an auxiliary groove with a skew having an electric angle of 75 degrees in the permanent magnet motor of FIG. 21.
Figure 23:
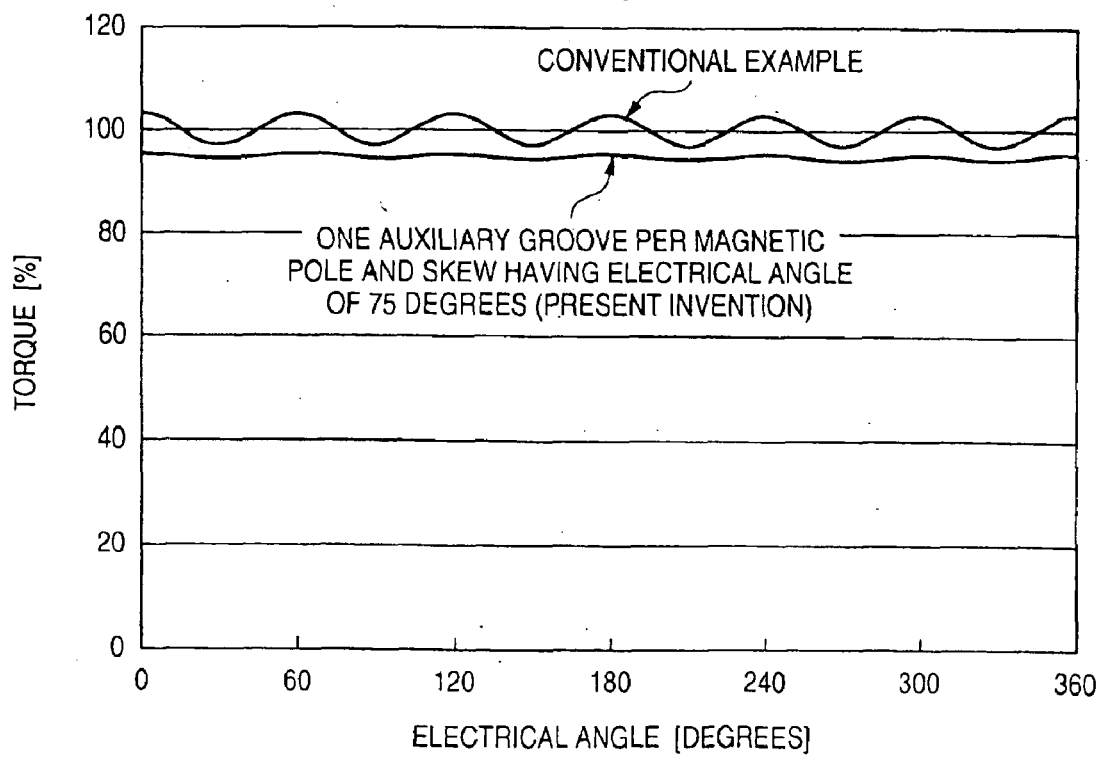
FIG. 23 is a waveform chart showing an energizing torque ripple of a permanent magnet motor according to the invention as compared with the conventional motor.

In FIG. 21, one auxiliary groove 4 is provided for each magnetic pole 3 of a stator 6. When no auxiliary groove 4 is provided, the period of the cogging torque is an electric angle per rotation of the rotor, 180×10=1800 degrees divided by the smallest integer, 60, of which the number of poles 10 and the number of slots 12 are both factors, and is equal to 30 degrees in electrical angle. If one auxiliary groove 4 is provided for each magnetic pole, as shown in FIG. 21, there appears the same effect as when the number of slots is 24. If the auxiliary groove 4 is considered as the slot 5, the smallest integer of which the number of poles and the number of slots are factors is 120. Therefore, the period of cogging torque is 15 degrees in electrical angle. Accordingly, it is required that the skew angle be an integer multiple of 15 degrees in electrical angle to greatly reduce the cogging torque. On the other hand, it is required that the skew angle be an electrical angle of 65 to 78 degrees to reduce the torque ripple, as described for the first embodiment. For example, when a skew with an electrical angle of 75 degrees (=15 degrees×5) is provided, it is possible to reduce the torque ripple and also the cogging torque greatly. FIG. 22 shows a waveform of cogging torque. The abscissa represents the rotation angle of the rotor 9 in electrical angle, and the ordinate represents the cogging torque. When no auxiliary groove 4 is provided, the cogging torque has a period of 30 degrees in electrical angle, and if one auxiliary groove 4 is provided for each magnetic pole 3, the cogging torque has a period of 15 degrees in electrical angle. If a skew with an electrical angle of 75 degrees is provided, the cogging torque can be greatly reduced, because the skew is an integer multiple (five times) of the cogging torque. FIG. 23 shows a waveform chart of an energizing torque waveform when one auxiliary groove is provided for each magnetic pole 3 and a skew with an electrical angle of 75 degrees is provided. For comparison, the conventional example is also shown. In the case where one auxiliary groove is provided for each magnetic pole as in this embodiment and a skew with an electrical angle of 75 degrees is provided, the sixth order component of the torque ripple is greatly reduced to produce a smooth torque waveform.

The above discussion is generalized below. To greatly reduce the torque ripple as described in the first embodiment, the fifth harmonic is noted, and the skew angle is made from 65 to 78 degrees in electric angle. Furthermore, the auxiliary grooves are provided and the skew angle is made an integral multiple of cogging torque to reduce the cogging torque.

It is supposed that the number of poles for the rotor is M, the number of poles for the stator is P, and n auxiliary grooves are provided for each magnetic pole. And the smallest number of which M and (n+1)P are factors is X. Then, the period Y of the cogging torque is represented such as:

$$Y=180 \cdot M/X$$

Then, if there is a positive integer m satisfying a relation $$65<mY<78$$

the permanent magnet motor can be constructed in the above manner.

Figure 24:
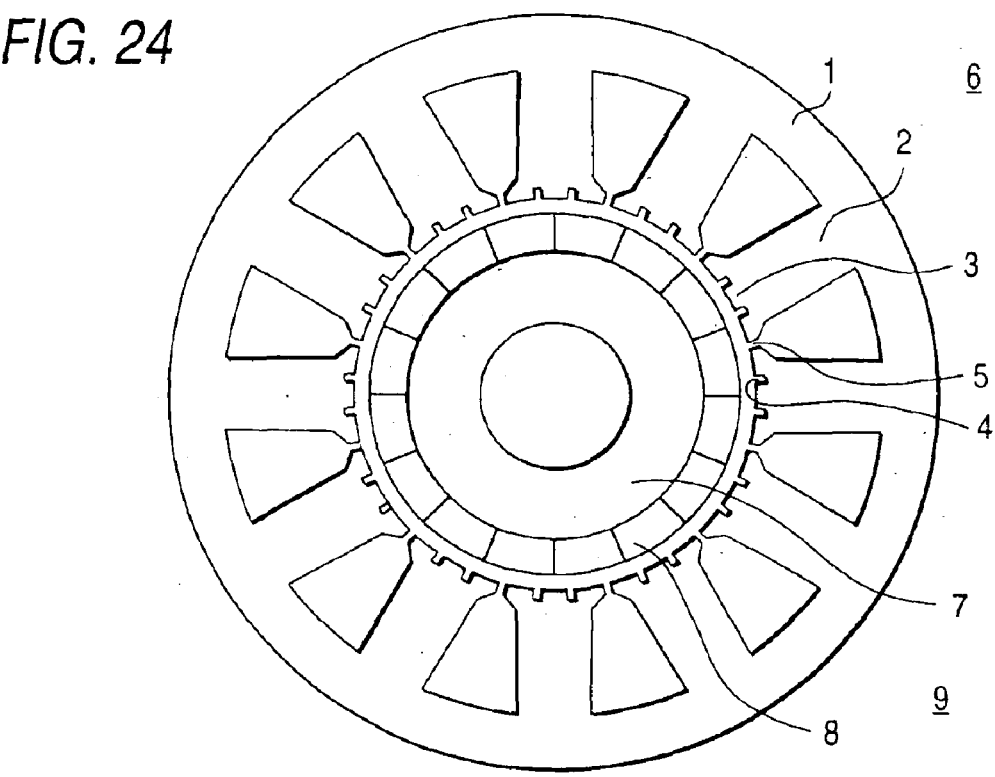
FIG. 24 is a view showing a permanent magnet motor with fourteen poles and twelve slots (M=14, P=12)

Of course, FIG. 21 shows a simple example. FIG. 24 is an example of the permanent magnet motor with fourteen poles and twelve slots (M=14, P=12). If two auxiliary grooves 4 are provided for each magnetic pole 3 (n=2), X becomes equal to 252.

Hence, the period Y of cogging torque is equal to $$Y=180 \cdot 14/252=10 \text{ degrees}$$

If m is equal to 7, the relation 65<mY<78 is satisfied, and the skew angle may be 70 degrees in electrical angle.

Figure 25:
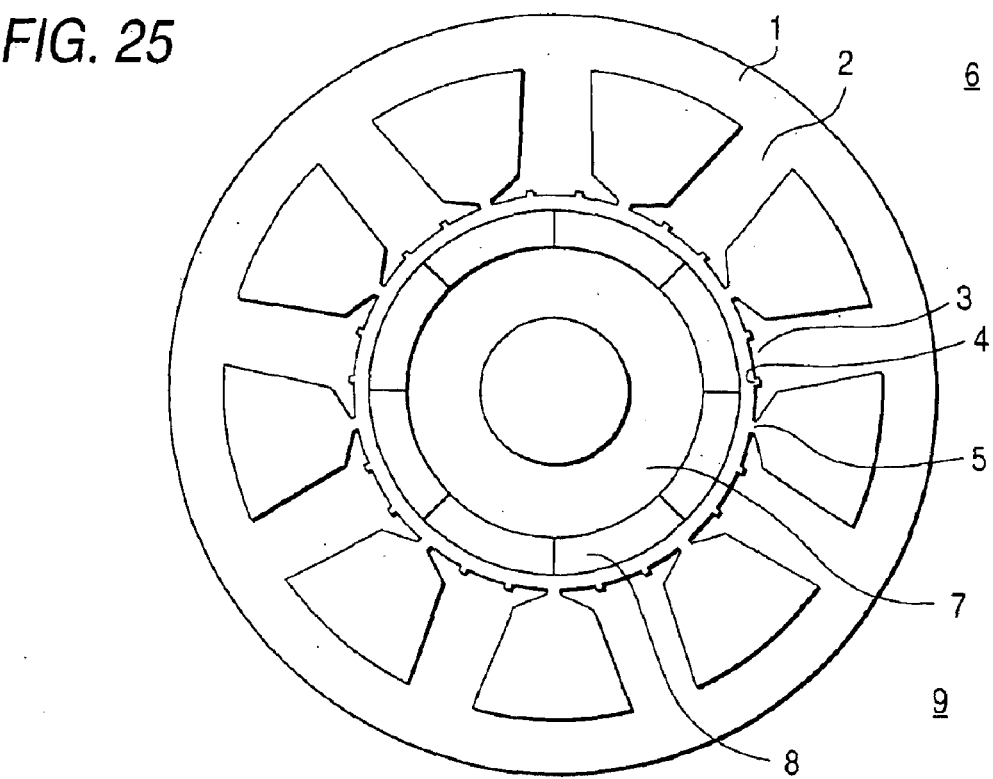
FIG. 25 is a view showing a permanent magnet motor with eight poles and nine slots (M=8, P=9).

FIG. 25 is an example of the permanent magnet motor with eight poles and nine slots (M=8, P=9). If two auxiliary grooves 4 are provided for each magnetic pole 3 (n=2), X becomes equal to 216. Hence, the period Y of cogging torque is equal to $$Y=180 \cdot 8/216=6.7 \text{ degrees}$$

If m is equal to 11, the relation 65<mY<78 is satisfied, and the skew angle may be 73.3 degrees in electrical angle.

Figure 26:
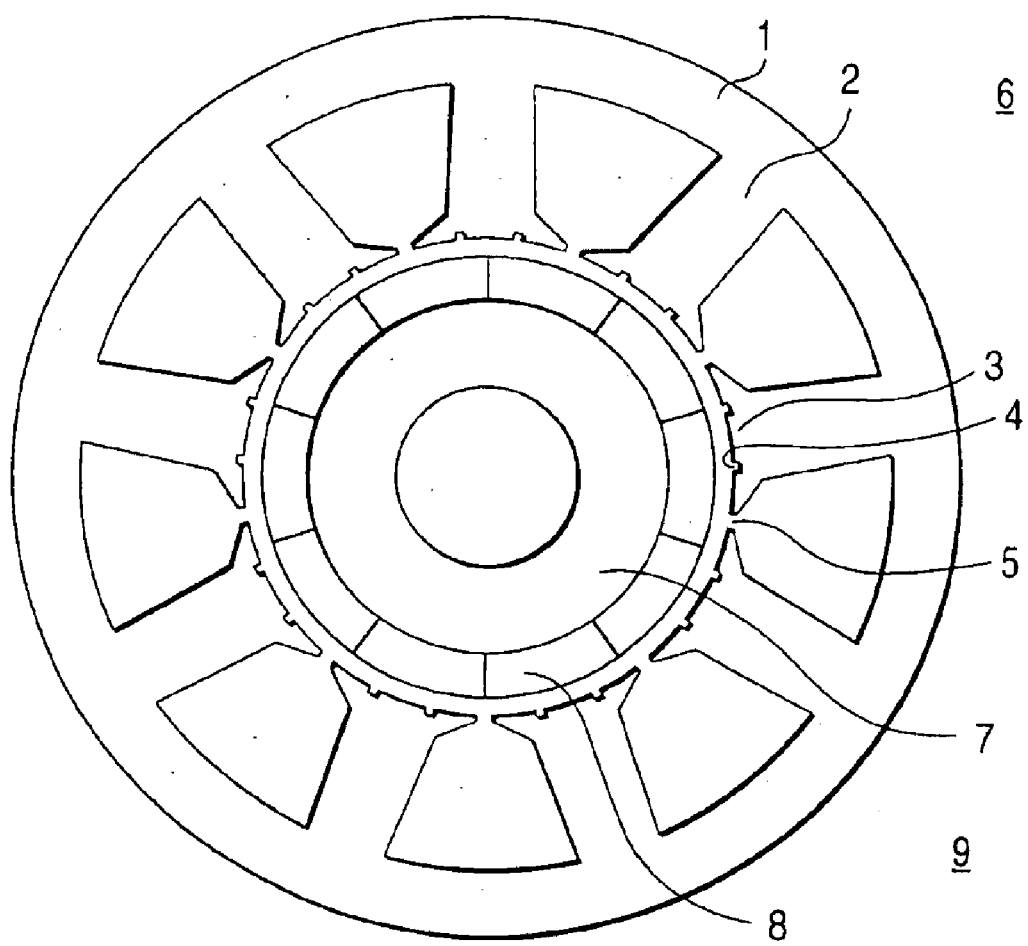
FIG. 26 is a view showing a permanent magnet motor with ten poles and nine slots (M=10, P=9).

FIG. 26 is an example of the permanent magnet motor with ten poles and nine slots (M=10, P=9). If two auxiliary grooves 4 are provided for each magnetic pole 3 (n=2), X becomes equal to 270. Hence, the period Y of cogging torque is equal to $$Y=180 \cdot 10/270=6.7 \text{ degrees}$$

If m is equal to 11, the relation 65<mY<78 is satisfied, and the skew angle may be 73.3 degrees in electrical angle.

FIG. 27 is a table listing examples of the invention by the number of poles and the number of slots. Of course, they are simply some examples, and an infinite number of examples may be conceived. In FIGS. 1, 6, 8 and 9, since the period Y of cogging torque is 12 degrees in electrical angle, the example of m=6 is shown when the skew angle is 72 degrees in electrical angle. Furthermore, among the listed examples, the electric motors with the combinations of number of poles=10N, number of slots=12N (N is a positive integer) number of poles=14N, number of slots 12N (N is a positive integer) number of poles=8N, number of slots=9N (N is a positive integer) number of poles=10N, number of slots=9N (N is a positive integer) have advantages that the winding factor is large and the motor output can be large. Since the winding factor is large, the degree of freedom in designing the electric motor can be increased in this embodiment. Furthermore, there is the effect that the "compatibility of the low cogging torque and the low torque ripple" is realized. Considering the size of the top end of the magnetic pole piece in the stator, the auxiliary grooves can be easily made so long as the number n of auxiliary grooves provided for each magnetic pole for the stator is less than or equal to four. Therefore, the mass productivity can be improved.

When the electric motor is employed as a driving source of an electric power steering system, excellent steering feel is obtained.

In this embodiment, it is assumed that the permanent magnet motor and gear in the electric power steering system are directly connected with each other without a coupling made of rubber or the like. In order to have excellent steering feeling, the torque ripple is equal to or less than 2% of the rated torque. Accordingly, the skew angle has been set in a range of 65 degrees to 78 degrees in electric angle. However, by adding a rubber coupling or rubber cushion, even if the torque ripple is equal to or less than 4% of the rated torque, the driver can have excellent steering feel. Therefore, the skew angle may be in a range of 61 degrees to 84 degrees in electric angle. In other words, when 61<mY<84 is satisfied, the desired steering feel can be obtained.

Eighth Embodiment

The techniques for reducing the cogging torque have been described above in which an auxiliary groove is provided and a skew is provided. However, the cogging torque may not be reduced unless the width of auxiliary groove is appropriate. Also, if a winding slot opening is too wide, the cogging torque is increased. Conversely, if the winding slot opening is too narrow, a leakage flux occurs between adjacent magnetic poles due to a magnetomotive force caused by an electric current flowing through the armature windings at the time of loading, and a magnetic saturation occurs in the magnetic poles due to this leakage flux. The magnetic saturation greatly increases the torque ripple at the time of loading. Therefore, it is considered that there may be a range of the width of the auxiliary groove or winding slot opening to realize the "compatibility of the low cogging torque and the low torque ripple". Thus, assuming that the width of the auxiliary groove is d, the width of winding slot opening is c, and the interval of winding slot openings is W, the relation between the cogging torque and the torque ripple can be considered (c=d in this embodiment).

Figure 28:
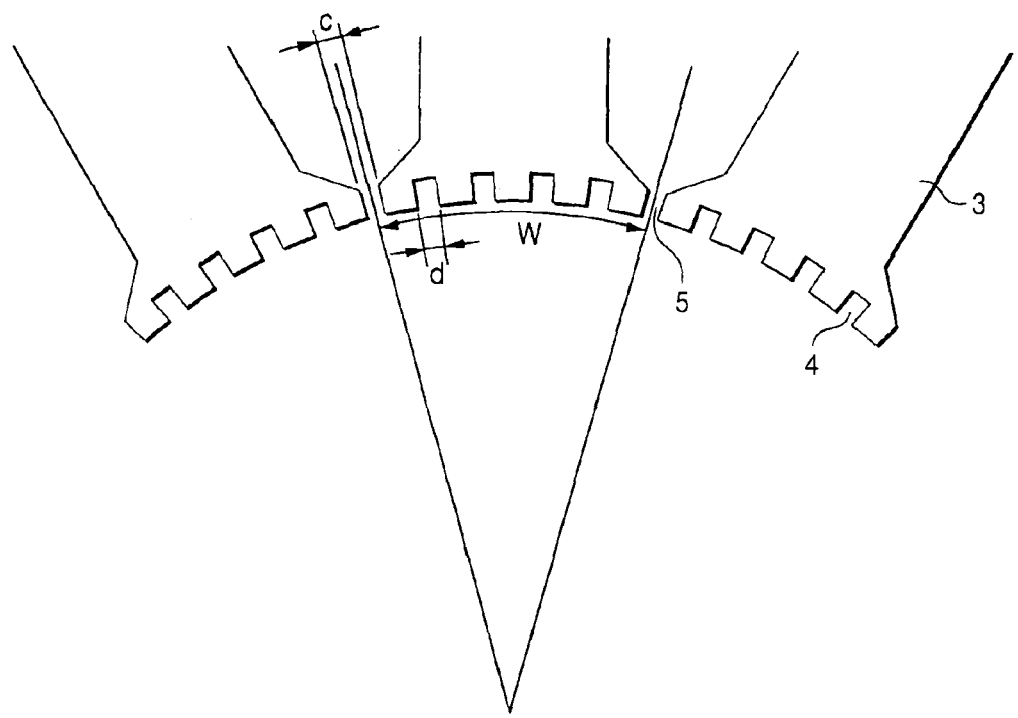
FIG. 28 is an enlarged view showing a magnetic pole piece for the stator of a permanent magnet motor according to the invention.
Figure 29:
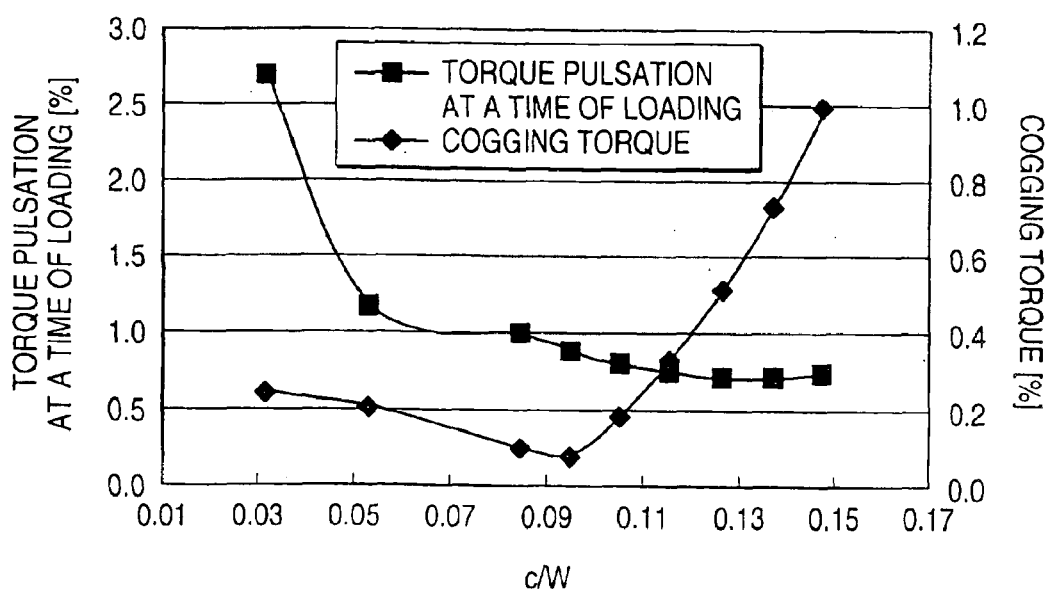
FIG. 29 is a graph representing how the cogging torque and the torque ripple vary with respect to c/W.

FIG. 28 is an enlarged view of a magnetic pole piece 3 for the stator 6 in the permanent magnet motor. Herein, c, d and W are defined as shown in FIG. 28. Particularly, W is defined such as:

W=stator inner diameter (diameter)×π/number of slots
Where the "number of slots" does not include the number of auxiliary grooves, and includes the number of winding slots alone. Employing the value c divided by W, i.e., (c/W), as a parameter, the auxiliary groove and winding slot width c and the slot interval W for the electric motor is normalized. Thus, a permanent magnet motor in which an electric current passing at a rated torque of 3 Nm has a sinusoidal waveform is designed. The variation of the cogging torque and the torque ripple with respect to c/W are represented in graphs. FIG. 29 shows the graphs. The energizing torque ripple becomes larger as the c/W becomes smaller, that is, the width of the auxiliary groove and width of winding slot opening c become smaller. As c/W becomes larger, the energizing torque ripple is smaller. This is considered due to the fact that as c/W becomes smaller, the magnetic flux density of magnetic poles is increased due to leakage flux produced between adjacent magnetic poles, and the torque ripple is increased. Conversely, this is considered because as c/W becomes larger, the magnetic saturation is relieved and the torque ripple becomes smaller. Particularly, when c/W is greater than 0.040, the energizing torque ripple is about 2% or less of the average torque.

On the other hand, as the c/W becomes larger, the cogging torque becomes larger. This is considered due to the fact that as the width of the auxiliary groove and width of the winding slot opening c become larger, the pulsation of permeance at the top end of magnetic pole in the stator becomes larger. Also, if the c/W becomes larger, the equivalent void length is increased and the torque may be lowered. As the c/W becomes smaller or the width of opening becomes smaller, the cogging torque tends to be smaller. This is considered due to the fact that as the width of the auxiliary groove and width of the winding slot opening c become smaller, the pulsation of permeance at the top end of magnetic pole in the stator and in the void portion are reduced. It is found that especially when c/W is smaller than 0.125, the cogging torque is as small as about 0.5%. For example, in an electric power steering system, excellent steering feel cannot be obtained unless the torque ripple of the motor used as the drive source is about 2% or less of the rated torque in terms of typical gear ratio. Also, excellent steering feel cannot be obtained, unless the cogging torque relevant at the time of minute steering is 0.5% or less of the rated torque.

From the foregoing discussion, in the permanent magnet motor, if 0.040<c/W<0.125, the magnetic saturation caused due to leakage flux between adjacent magnetic poles of the armature is relieved, and the torque ripple at the time of loading can be reduced. Also, the pulsation of permeance with the winding slots and auxiliary grooves can be reduced, and the cogging torque can be greatly reduced.

Figure 30:
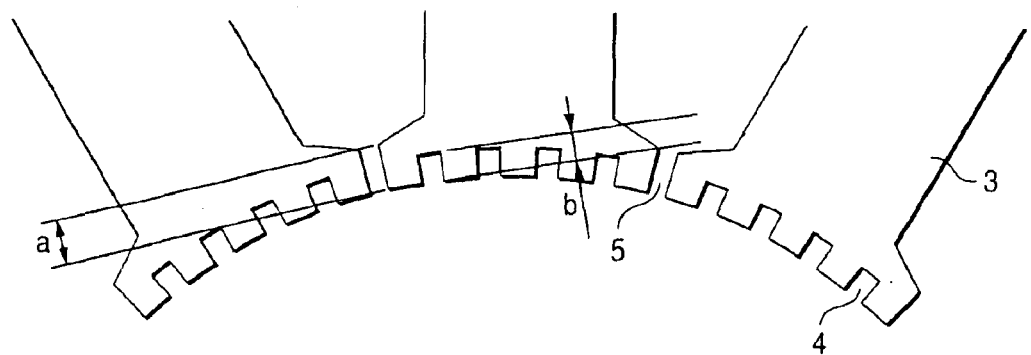
FIG. 30 is an enlarged view showing a portion of a magnetic pole in a permanent magnet motor.
Figure 31:
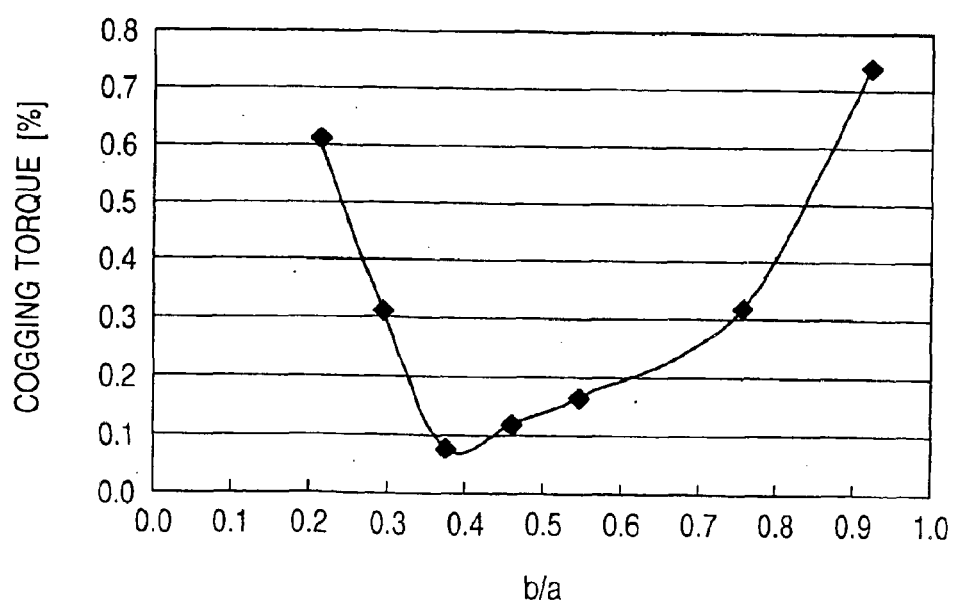

FIG. 30 is an enlarged view showing the top end portion of magnetic poles in the permanent magnet motor. The auxiliary grooves are provided to reduce the cogging torque. However, if the depth of auxiliary grooves is inappropriate, the auxiliary grooves may not function properly, so that the cogging torque cannot be reduced. This is because the cogging torque cannot be reduced unless the pulsation of permeance with the auxiliary groove and the pulsation of permeance with the winding slots are equivalent or substantially equivalent. Thus, assuming that the height of end portion of the magnetic pole 3 is a and the depth of auxiliary groove 4 is b, the ratio b/a is changed to obtain the cogging torque. In this manner, if the depth b of auxiliary groove 4 is normalized by the height a of end portion of the magnetic pole 3, a variation in the cogging torque with the depth b of the auxiliary groove 4 can be qualitatively determined advantageously. FIG. 31 is a graph representing how the cogging torque varies with respect to b/a by designing a permanent magnet motor in which an electric current passing at a rated torque of 3 Nm has a sinusoidal waveform. The abscissa indicates the ratio b/a in which the height of end portion of the magnetic pole 3 in the stator is a and the depth of auxiliary groove 4 is b, and the ordinate indicates the cogging torque. From this result, it can be found that the cogging torque is increased if b/a is too large or too small. That is, if the depth b of auxiliary groove 4 is too shallow or too deep, the auxiliary groove 4 cannot function properly, and the cogging torque is not reduced fully. If the auxiliary groove 4 is too shallow, the pulsation of permeance in the auxiliary groove 4 may be smaller than the winding slot. Consequently, the pulsation of permeance in the auxiliary groove 4 and that in the winding slot are not equivalent or substantially equivalent, so that the cogging torque is not fully reduced. Conversely, if the depth of auxiliary groove 4 is too large, the pulsation of permeance in the auxiliary groove 4 is larger than that in the winding slot. Hence, the pulsation of permeance in the auxiliary groove 4 and in the winding slot are not equivalent or substantially equivalent, so that the cogging torque is not reduced fully. Also, if the depth b of auxiliary groove 4 is too large, the equivalent air gap in the electric motor becomes large, possibly resulting in lower torque. Therefore, it is better that the depth b of auxiliary groove 4 is not too large. Furthermore, if the depth b of auxiliary groove 4 is too large, the core on the upper portion of two of four auxiliary grooves 4 provided for each magnetic pole 3 is very thin, resulting in lower mechanical strength. From this, it is better that the depth b of auxiliary groove 4 is not too large.

From the result of FIG. 31, especially in the range of 0.25<b/a<0.82, the cogging torque is greatly reduced, to as small as 0.5% or less of the rated torque. If the depth b of auxiliary groove 4 and the height a of end portion of the magnetic pole 3 in the stator are set up in the above manner, the auxiliary groove 4 can take a full effect to reduce the cogging torque greatly.

The ratio b/a of the depth b of auxiliary groove 4 to the height a of end portion of the magnetic pole 3 in the stator has no effect on the energizing torque ripple.

Ninth Embodiment

Figure 32:
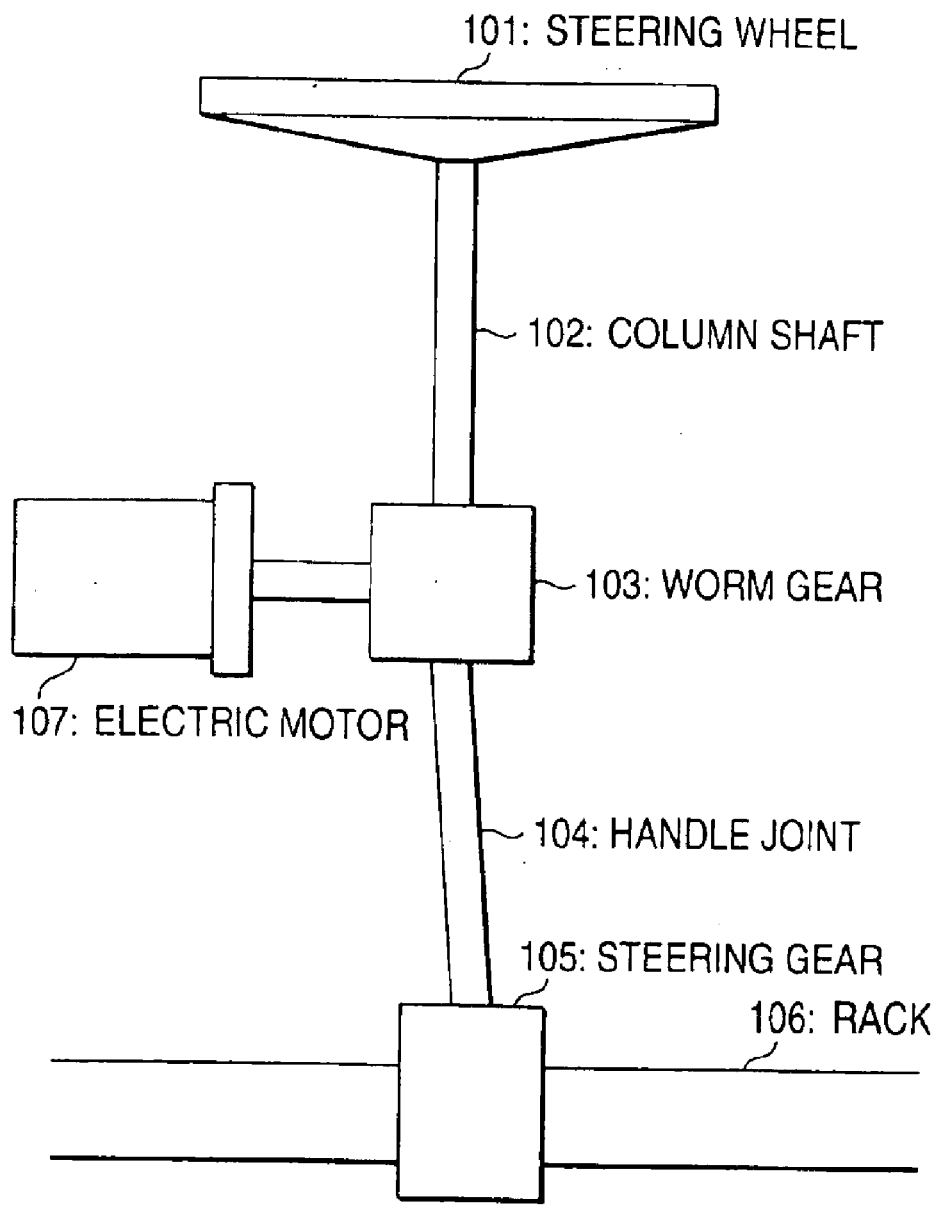
FIG. 32 is a schematic view of a part of an electric power steering system.

FIG. 32 is a schematic view of an electric power steering gear.

A control force is transmitted from a steering wheel 101 to a column shaft 102. A worm gear 103 (only a gear box is shown in the figure, though not shown in detail) transmits an output (torque, number of rotations) of the motor by orthogonally transforming the rotation direction, while decelerating to increase the assist torque. A handle joint 104 transmits a control force, and changes the direction. A steering gear 105 (only a gear box is shown in the figure, though not shown in detail) decelerates the rotation of a column shaft, while at the same time converting it into a linear motion of a rack 106 to produce a desired transition. This linear motion of this rack 106 moves the wheels and changes the direction of the vehicle.

In the above electric power steering system, a pulsation of torque occurring in the motor is transmitted via the worm gear 103 and the column shaft 102 to the steering wheel 101. Accordingly, the driver cannot have a smooth steering feeling, when the motor produces a large torque ripple. Also, if the motor produces a large cogging torque, even when the motor does not produce an assist torque, the driver cannot have a smooth steering feel.

If this invention is applied to the electric power steering system, the "compatibility of low cogging torque and low torque ripple" can be realized, whereby the driver can have a smooth steering feel.

In particular, the small cogging torque of the motor, which is a driving source, has a very favorable effect on the feel at the time of minute steering, while running on a highway.

Since the driving voltage of the electric power steering gear for the vehicle is as low as about 12V, the current value of the motor may be increased up to 100A or more. Accordingly, the diameter of the windings of motor is increased, resulting in a problem that the winding workability is degraded. Also, in an electric motor with a large number of parallel circuits and a small number of poles it was difficult to reduce the cogging torque and the torque ripple because of the relation between the number of poles and the number of slots.

However, with this invention, the electric motor can have an increased number of parallel circuits, with reduced diameter of armature windings for the stator, leading to improved winding workability, whereby the mass productivity of electric motor can be enhanced. Furthermore, in the case where four auxiliary grooves are provided for each magnetic pole in the stator, they are dimensionally easily worked, whereby there is the advantage that an electric motor with high productivity can be provided.

According to the present invention, there is provided a permanent magnet motor having a rotor with a plurality of permanent magnets disposed at a uniform interval in a peripheral direction, and a stator with a plurality of magnetic pole pieces arranged at a predetermined spacing in the peripheral direction, the magnetic pole pieces being opposed to the permanent magnets, wherein auxiliary grooves are provided in a face of each magnetic pole piece of the stator that is opposed to the permanent magnets of the rotor, and a skew having an electric angle of 72° is provided relatively between the rotor and the stator. Hence, the cogging torque and the torque ripple are reduced at the same time. Thus, the permanent magnet motor of high performance can be provided.

According to the invention, there is provided the permanent magnet motor, wherein a skew having an electric angle of 72° is provided relatively between the rotor and the stator, where the number of poles is equal to 2N, and the number of slots is equal to 3N (N is an integer greater than or equal to 1). Hence, the cogging torque and the torque ripple are reduced at the same time. Thus, the permanent magnet motor of high performance can be provided.

According to the invention, there is provided the permanent magnet motor, wherein a skew having an electric angle of 72° is provided relatively between the rotor and the stator, where the number of poles is equal to N, and the number of slots is equal to 3N (N is an even number greater than or equal to 2). Hence, the cogging torque and the torque ripple are reduced at the same time, and it is possible to provide the permanent magnet motor of high performance.

According to the invention, there is provided the permanent magnet motor, wherein a skew having an electric angle of 72° is provided relatively between the rotor and the stator, where the number of poles is equal to 4N, and the number of slots is equal to 3N (N is an integer greater than or equal to 1). Hence, the cogging torque and the torque ripple are reduced at the same time, and it is possible to provide the permanent magnet motor of high performance.

According to the invention, there is provided the permanent magnet motor, wherein a skew is disposed on either one of the rotor and the stator. Hence, the cogging torque and the torque ripple are reduced at the same time, and it is possible to provide the permanent magnet motor of high performance.

According to the invention, there is provided the permanent magnet motor, wherein a skew is disposed one both the rotor and the stator. Hence, the cogging torque and the torque ripple are reduced at the same time, and it is possible to provide the permanent magnet motor of high performance.

According to the invention, there is provided the permanent magnet motor, wherein four auxiliary grooves are provided for every magnetic pole piece. Hence, the cogging torque and the torque ripple are reduced at the same time, and it is possible to provide the permanent magnet motor in which the auxiliary grooves can be easily fabricated.

According to the invention, there is provided the permanent magnet motor, wherein the windings of the stator are concentrated. As a result, the cogging torque and the torque ripple are reduced at the same time, and it is possible to provide the permanent magnet motor which can be reduced in size and in which the winding operation is facilitated.

According to the invention, there is provided the permanent magnet motor, wherein the permanent magnet of the rotor is magnetized in a radial direction. As a result, it is possible to provide the permanent magnet motor in which the cogging torque and the torque ripple are reduced at the same time.

In the above-described first to fifth embodiments, an inner rotor type electric motor is exemplified. This invention is not limited to such inner rotor electric motor, but may be applied to an outer rotor type electric motor, in which it is needless to say that the same effect as above can be exhibited.

Further, besides the inner rotor type and the outer rotor type, this invention is applicable to a linear type electric motor.

What is claimed is:

1. A permanent magnet motor comprising:
  a rotor having M magnetic poles disposed at an interval in a peripheral direction of the rotor;
  a stator having P magnetic pole pieces arranged at a spacing in the peripheral direction, the P magnetic pole pieces being opposed to the M magnetic poles of the rotor;
  respective slots between adjacent magnetic pole pieces of the stator, wherein $0.25 < b/a < 0.82$, b is depth of each of the auxiliary grooves in the faces of the P magnetic pole pieces, transverse to the peripheral direction, and
  a is depth of each of the P magnetic pole pieces adjacent to the slots, transverse to the peripheral direction; and
  n auxiliary grooves in a face of each of the magnetic pole pieces of the stator opposed to the magnetic poles of the rotor, wherein
  the smallest integer of which M and (n+1)·P are factors is X,
  m satisfies $61 < (180 \text{ mM})/X < 84$,
  M, P, m, and n are integers, and
  a skew having an electrical angle in a range of 61° to 84° is provided relatively between the rotor and the stator on at least one of the rotor and the stator.

2. The permanent magnet motor according to claim 1, and wherein the rotor has 2N magnetic poles, the stator has 3N slots, and N is a positive integer.

3. The permanent magnet motor according to claim 1, wherein the rotor has N magnetic poles, the stator has 3N slots, and N is a positive even integer.

4. The permanent magnet motor according to claim 1, wherein the rotor has 4N magnetic poles, the stator has 3N slots, and N is a positive integer.

5. The permanent magnet motor according to claim 1, wherein the skew is provided on both the rotor and the stator.

6. The permanent magnet motor according to claim 1, wherein the magnetic poles of the rotor are selected from the group consisting of radially anisotropic permanent magnets and radially magnetized permanent magnets.

7. The permanent magnet motor according to claim 1, wherein the rotor has 10N magnetic poles, the stator has 12N slots, and N is a positive integer.

8. The permanent magnet motor according to claim 1, wherein the motor has 14N magnetic poles, the stator has 12N slots, and N is a positive integer.

9. The permanent magnet motor according to claim 1, wherein the rotor has 8N magnetic poles, the stator has 9N slots, and N is a positive integer.

10. The permanent magnet motor according to claim 1, wherein the rotor has 10N magnetic poles, the stator has 9N slots, and N is a positive integer.

11. The permanent magnet motor according to claim 1, including respective slots between adjacent magnetic pole pieces of the stator, wherein $$0.040 < c/W < 0.125,$$

c is a dimension, measured along the peripheral direction, at the faces of the P magnetic pole pieces, that is (i) distance between nearest pairs of magnetic pole pieces and (ii) width of each auxiliary groove, and W is distance, measured along the peripheral direction, at the faces of the P magnetic pole pieces, between centers of nearest pairs of the slots.

12. An electric power steering system comprising a permanent magnet motor including:

a rotor having M magnetic poles disposed at an interval in a peripheral direction of the rotor;

a stator having P magnetic pole pieces arranged at a spacing in the peripheral direction, the P magnetic pole pieces being opposed to the M magnetic poles of the rotor;

respective slots between adjacent magnetic pole pieces of the stator, wherein $$0.040 < c/W < 0.125,$$

c is a dimension, measured along the peripheral direction, at the faces of the P magnetic pole pieces, that is (i) the distance between nearest pairs of magnetic pole pieces and (ii) the width of each auxiliary groove, W is the distance, measured along the peripheral direction, at the faces of the P magnetic pole pieces, between centers of nearest pairs of the slots, $$0.25 < b/a < 0.82,$$

b is the depth of each of the auxiliary grooves in the faces of the P magnetic pole pieces, transverse to the peripheral direction, and a is the depth of each of the P magnetic pole pieces adjacent to the slots, transverse to the peripheral direction;

n auxiliary grooves in a face of each of the magnetic pole pieces of the stator opposed to the magnetic poles of the rotor, wherein the smallest integer of which M and $(n+1) \cdot P$ are factors is X, m satisfies $61 < (180 \, mM)/X < 84$, M, P, m, and n are integers, and a skew having an electrical angle in a range of 61° to 84° is provided relatively between the rotor and the stator.

* * * * *